US012179494B2

(12) United States Patent
Okuno

(10) Patent No.: US 12,179,494 B2
(45) Date of Patent: Dec. 31, 2024

(54) SYSTEM, PRINTING APPARATUS, AND METHOD FOR MANAGING CONSUMABLE MATERIAL WITHOUT MEASURING ACTUAL REMAINING AMOUNT OF CONSUMABLE MATERIAL

(71) Applicant: BROTHER KOGYO KABUSHIKI KAISHA, Nagoya (JP)

(72) Inventor: Tetsuya Okuno, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 212 days.

(21) Appl. No.: 18/062,168

(22) Filed: Dec. 6, 2022

(65) Prior Publication Data

US 2023/0182477 A1 Jun. 15, 2023

(30) Foreign Application Priority Data

Dec. 9, 2021 (JP) ................................ 2021-199995

(51) Int. Cl.
*B41J 2/175* (2006.01)

(52) U.S. Cl.
CPC ....... *B41J 2/17566* (2013.01); *B41J 2/17506* (2013.01); *B41J 2/17553* (2013.01); *B41J 2002/17569* (2013.01)

(58) Field of Classification Search
CPC ......................... B41J 2/17566; B41J 2/17506; B41J 2/17553; B41J 2002/17569
See application file for complete search history.

(56) References Cited

U.S. PATENT DOCUMENTS

| | | | | |
|---|---|---|---|---|
| 2014/0023382 | A1* | 1/2014 | Kawana | G03G 15/5079 399/8 |
| 2019/0193414 | A1 | 6/2019 | Miyazawa et al. | |

FOREIGN PATENT DOCUMENTS

| | | | | | |
|---|---|---|---|---|---|
| CN | 110303771 | A | * | 10/2019 | B41J 2/175 |
| JP | 2019-117614 | A | | 7/2019 | |
| JP | 2020023180 | A | * | 2/2020 | B41J 2/175 |
| JP | 2022023913 | A | * | 2/2022 | B41J 2/17506 |

* cited by examiner

*Primary Examiner* — Sharon Polk
(74) *Attorney, Agent, or Firm* — Merchant & Gould P.C.

(57) ABSTRACT

A system includes a tank and a print engine. The tank is configured to store a consumable material for printing supplied in units of a predetermined volume from a reservoir. The print engine is configured to perform image formation on a printing medium using the consumable material in the tank. The system is configured to obtain a cumulative consumption amount of the consumable material used for the image formation by the print engine, obtain the predetermined volume, obtain an order count representing how many times the reservoir has been heretofore ordered, obtain a consumption error correction value for correcting an individual difference in consumption characteristics of the print engine, and determine whether to order a new reservoir based on the cumulative consumption amount of the consumable material, the predetermined volume, the order count, and the consumption error correction value.

12 Claims, 26 Drawing Sheets

| CUMULATIVE CONSUMPTION INDEX | NUMBER OF BOTTLE ORDERING TIMES | ESTIMATED REMAINING AMOUNT |
|---|---|---|
| 0 | 0 | 100% |
| 1 | 0 | 80% |
| 2 | 0 | 60% |
| 3 | 0 | 40% |
| 4 | 0 | 20% |
| 4 | 1 | 120% |
| 5 | 1 | 100% |
| 6 | 1 | 80% |
| 7 | 1 | 60% |
| 8 | 1 | 40% |
| .. | .. | .. |
| .. | .. | .. |

A new bottle is ordered when the estimated remaining amount is 20% volume

100% volume is added to 20% volume

FIG. 3B

| CUMULATIVE CONSUMPTION INDEX | CUMULATIVE CONSUMPTION INDEX TAKING INTO ACCOUNT INDIVIDUAL DIFFERNCES | | | DEVIATION FROM STANDARD VALUE |
|---|---|---|---|---|
| | -5% | ±0 | +5% | |
| 1 | 0.95 | 1 | 1.05 | 0.05 |
| 2 | 1.9 | 2 | 2.1 | 0.1 |
| 3 | 2.85 | 3 | 3.15 | 0.15 |
| 4 | 3.8 | 4 | 4.2 | 0.2 |
| 5 | 4.75 | 5 | 5.25 | 0.25 |
| 6 | 5.7 | 6 | 6.3 | 0.3 |
| 7 | 6.65 | 7 | 7.35 | 0.35 |
| 8 | 7.6 | 8 | 8.4 | 0.4 |
| 9 | 8.55 | 9 | 9.45 | 0.45 |
| 10 | 9.5 | 10 | 10.5 | 0.5 |

FIG. 4A

| CUMULATIVE CONSUMPTION INDEX | ESTIMATED REMAINING AMOUNT CONTAINING CONSUMPTION ERROR | | |
|---|---|---|---|
| | -5% | ±0 | +5% |
| 0 | 100% | 100% | 100% |
| 1 | 81% | 80% | 79% |
| 2 | 62% | 60% | 58% |
| 3 | 43% | 40% | 37% |
| 4 | 24% | 20% | 16% |
| 5 | 5% | 0% | -5% |
| .. | .. | .. | .. |

FIG. 4B

| CUMULATIVE CONSUMPTION INDEX | NUMBER OF BOTTLE ORDERING TIMES | ESTIMATED REMAINING AMOUNT CONTAINING CONSUMPTION ERROR | | |
|---|---|---|---|---|
| | | -5% | ±0 | +5% |
| 0 | 0 | 100% | 100% | 100% |
| 1 | 0 | 81% | 80% | 79% |
| 2 | 0 | 62% | 60% | 58% |
| 3 | 0 | 43% | 40% | 37% |
| 4 | 0 | 24% | 20% | 16% |
| 4 | 1 | 124% | 120% | 116% |
| 5 | 1 | 105% | 100% | 95% |
| 6 | 1 | 86% | 80% | 74% |
| 7 | 1 | 67% | 60% | 53% |
| 8 | 1 | 48% | 40% | 32% |
| 9 | 1 | 29% | 20% | 11% |
| 9 | 2 | 129% | 120% | 111% |
| 10 | 2 | 110% | 100% | 90% |
| 11 | 2 | 91% | 80% | 69% |
| 12 | 2 | 72% | 60% | 48% |
| 13 | 2 | 53% | 40% | 27% |
| 14 | 2 | 34% | 20% | 6% |
| 14 | 3 | 134% | 120% | 106% |
| 15 | 3 | 115% | 100% | 85% |
| 16 | 3 | 96% | 80% | 64% |
| 17 | 3 | 77% | 60% | 43% |
| 18 | 3 | 58% | 40% | 22% |
| 19 | 3 | 39% | 20% | 1% |
| 19 | 4 | 139% | 120% | 101% |

FIG. 8A

| | | | | |
|---|---|---|---|---|
| 20 | 4 | 120% | 100% | 80% |
| 21 | 4 | 101% | 80% | 59% |
| 22 | 4 | 82% | 60% | 38% |
| 23 | 4 | 63% | 40% | 17% |
| 24 | 4 | 44% | 20% | -4% |
| 24 | 5 | 144% | 120% | 96% |
| 25 | 5 | 125% | 100% | 75% |
| 26 | 5 | 106% | 80% | 54% |
| 27 | 5 | 87% | 60% | 33% |
| 28 | 5 | 68% | 40% | 12% |
| 29 | 5 | 49% | 20% | -9% |
| 30 | 5 | 30% | 0% | -30% |

FIG. 8B

| CUMULATIVE CONSUMPTION INDEX | NUMBER OF BOTTLE ORDERING TIMES | ESTIMATED REMAINING AMOUNT CONTAINING CONSUMPTION ERROR | | |
|---|---|---|---|---|
| | | -5% | ±0 | +5% |
| 0 | 0 | 100% | 100% | 100% |
| 1 | 0 | 91% | 90% | 90% |
| 2 | 0 | 81% | 80% | 79% |
| 3 | 0 | 72% | 70% | 69% |
| 4 | 0 | 62% | 60% | 58% |
| 5 | 0 | 53% | 50% | 48% |
| 6 | 0 | 43% | 40% | 37% |
| 7 | 0 | 34% | 30% | 27% |
| 8 | 0 | 24% | 20% | 16% |
| 8 | 1 | 124% | 120% | 116% |
| 9 | 1 | 115% | 110% | 106% |
| 10 | 1 | 105% | 100% | 95% |
| 11 | 1 | 96% | 90% | 85% |
| 12 | 1 | 86% | 80% | 74% |
| 13 | 1 | 77% | 70% | 64% |
| 14 | 1 | 67% | 60% | 53% |
| 15 | 1 | 58% | 50% | 43% |
| 16 | 1 | 48% | 40% | 32% |
| 17 | 1 | 39% | 30% | 22% |
| 18 | 1 | 29% | 20% | 11% |
| 18 | 2 | 129% | 120% | 111% |
| 19 | 2 | 120% | 110% | 101% |
| 20 | 2 | 110% | 100% | 90% |
| 21 | 2 | 101% | 90% | 80% |
| 22 | 2 | 91% | 80% | 69% |
| 23 | 2 | 82% | 70% | 59% |
| 24 | 2 | 72% | 60% | 48% |
| 25 | 2 | 63% | 50% | 38% |

FIG. 10A

| | | | | |
|---|---|---|---|---|
| 26 | 2 | 53% | 40% | 27% |
| 27 | 2 | 44% | 30% | 17% |
| 27 | 3 | 144% | 130% | 117% |
| 28 | 3 | 134% | 120% | 106% |
| 29 | 3 | 125% | 110% | 96% |
| 30 | 3 | 115% | 100% | 85% |
| 31 | 3 | 106% | 90% | 75% |
| 32 | 3 | 96% | 80% | 64% |
| 33 | 3 | 87% | 70% | 54% |
| 34 | 3 | 77% | 60% | 43% |
| 35 | 3 | 68% | 50% | 33% |
| 36 | 3 | 58% | 40% | 22% |
| 37 | 3 | 49% | 30% | 12% |
| 37 | 4 | 149% | 130% | 112% |
| 38 | 4 | 139% | 120% | 101% |
| 39 | 4 | 130% | 110% | 91% |
| 40 | 4 | 120% | 100% | 80% |
| 41 | 4 | 111% | 90% | 70% |
| 42 | 4 | 101% | 80% | 59% |
| 43 | 4 | 92% | 70% | 49% |
| 44 | 4 | 82% | 60% | 38% |
| 45 | 4 | 73% | 50% | 28% |
| 46 | 4 | 63% | 40% | 17% |
| 46 | 5 | 163% | 140% | 117% |
| 47 | 5 | 154% | 130% | 107% |
| 48 | 5 | 144% | 120% | 96% |
| 49 | 5 | 135% | 110% | 86% |
| 50 | 5 | 125% | 100% | 75% |

FIG. 10B

| CUMULATIVE CONSUMPTION INDEX | NUMBER OF BOTTLE ORDERING TIMES | CUMULATIVE CONSUMPTION INDEX FOR COMPENSATION | ESTIMATED REMAINING AMOUNT | PHYSICAL REMAINING AMOUNT |
|---|---|---|---|---|
| 0 | 0 | 0 | 100% | 40% |
| 1 | 0 | 0 | 80% | 20% |
| 2 | 0 | 0 | 60% | 0% |
| 2 | 1 | 3 | 100% | 100% |
| 3 | 1 | 3 | 80% | 80% |
| 4 | 1 | 3 | 60% | 60% |
| 5 | 1 | 3 | 40% | 40% |
| 6 | 1 | 3 | 20% | 20% |
| 7 | 1 | 3 | 0% | 0% |
| 8 | 2 | 3 | 80% | 80% |
| 9 | 2 | 3 | 60% | 60% |
| .. | .. | .. | .. | .. |

FIG. 12A

| CUMULATIVE CONSUMPTION INDEX | NUMBER OF BOTTLE ORDERING TIMES | CUMULATIVE CONSUMPTION INDEX FOR COMPENSATION | | | ESTIMATED REMAINING AMOUNT CONTAINING CONSUMPTION ERROR | | |
|---|---|---|---|---|---|---|---|
| | | -5% | ±0 | +5% | -5% | ±0 | +5% |
| 0 | 0 | 0 | 0 | 0 | 100% | 100% | 100% |
| 1 | 0 | 0 | 0 | 0 | 81% | 80% | 79% |
| 2 | 0 | 0 | 0 | 0 | 62% | 60% | 58% |
| 2 | 1 | 3.1 | 3 | 2.9 | 100% | 100% | 100% |
| 3 | 1 | 3.1 | 3 | 2.9 | 81% | 80% | 79% |
| 4 | 1 | 3.1 | 3 | 2.9 | 62% | 60% | 58% |
| 5 | 1 | 3.1 | 3 | 2.9 | 43% | 40% | 37% |
| .. | .. | .. | .. | .. | .. | .. | .. |

FIG. 12B

| CUMULATIVE CONSUMPTION INDEX | NUMBER OF BOTTLE ORDERING TIMES | CORRECTED CUMULATIVE CONSUMPTION INDEX | ESTIMATED REMAINING AMOUNT CONTAINING CONSUMPTION ERROR | | |
|---|---|---|---|---|---|
| | | | -5% | ±0 | +5% |
| 0 | 0 | 0 | 100% | 100% | 100% |
| 1 | 0 | 0 | 81% | 80% | 79% |
| 2 | 0 | 0 | 62% | 60% | 58% |
| 3 | 0 | 0 | 43% | 40% | 37% |
| 4 | 0 | 0 | 24% | 20% | 16% |
| 4 | 1 | 0 | 124% | 120% | 116% |
| 5 | 1 | 0 | 105% | 100% | 95% |
| 6 | 1 | 0 | 86% | 80% | 74% |
| 7 | 1 | 0 | 67% | 60% | 53% |
| 8 | 1 | 0 | 48% | 40% | 32% |
| 9 | 1 | 0 | 29% | 20% | 11% |
| 9 | 2 | 9 | 120% | 120% | 120% |
| 10 | 2 | 9 | 101% | 100% | 99% |
| 11 | 2 | 9 | 82% | 80% | 78% |
| 12 | 2 | 9 | 63% | 60% | 57% |
| 13 | 2 | 9 | 44% | 40% | 36% |
| 14 | 2 | 9 | 25% | 20% | 15% |
| 14 | 3 | 9 | 125% | 120% | 115% |
| 15 | 3 | 9 | 106% | 100% | 94% |
| 16 | 3 | 9 | 87% | 80% | 73% |
| 17 | 3 | 9 | 68% | 60% | 52% |
| 18 | 3 | 9 | 49% | 40% | 31% |
| 19 | 3 | 9 | 30% | 20% | 10% |
| 19 | 4 | 19 | 120% | 120% | 120% |

FIG. 16A

| | | | | | |
|---|---|---|---|---|---|
| 20 | 4 | 19 | 101% | 100% | 99% |
| 21 | 4 | 19 | 82% | 80% | 78% |
| 22 | 4 | 19 | 63% | 60% | 57% |
| 23 | 4 | 19 | 44% | 40% | 36% |
| 24 | 4 | 19 | 25% | 20% | 15% |
| 24 | 5 | 24 | 120% | 120% | 120% |
| 25 | 5 | 24 | 101% | 100% | 99% |
| 26 | 5 | 24 | 82% | 80% | 78% |
| 27 | 5 | 24 | 63% | 60% | 57% |
| 28 | 5 | 24 | 44% | 40% | 36% |
| 29 | 5 | 24 | 25% | 20% | 15% |

FIG. 16B

| CUMULATIVE CONSUMPTION INDEX | NUMBER OF BOTTLE ORDERING TIMES | CORRECTED CUMULATIVE CONSUMPTION INDEX | ESTIMATED REMAINING AMOUNT CONTAINING CONSUMPTION ERROR | | |
|---|---|---|---|---|---|
| | | | -5% | ±0 | +5% |
| 0 | 0 | 0 | 100% | 100% | 100% |
| 1 | 0 | 0 | 81% | 80% | 79% |
| 2 | 0 | 0 | 62% | 60% | 58% |
| 3 | 0 | 0 | 43% | 40% | 37% |
| 4 | 0 | 0 | 24% | 20% | 16% |
| 4 | 1 | 0 | 124% | 120% | 116% |
| 5 | 1 | 0 | 105% | 100% | 95% |
| 6 | 1 | 0 | 86% | 80% | 74% |
| 7 | 1 | 0 | 67% | 60% | 53% |
| 8 | 1 | 0 | 48% | 40% | 32% |
| 9 | 1 | 0 | 29% | 20% | 11% |
| 9 | 0 | 9.95 | 118% | 119% | 120% |
| 10 | 0 | 9.95 | 99% | 99% | 99% |
| 11 | 0 | 9.95 | 80% | 79% | 78% |
| 12 | 0 | 9.95 | 61% | 59% | 57% |
| 13 | 0 | 9.95 | 42% | 39% | 36% |
| 14 | 0 | 9.95 | 23% | 19% | 15% |
| 14 | 1 | 9.95 | 123% | 119% | 115% |
| 15 | 1 | 9.95 | 104% | 99% | 94% |
| 16 | 1 | 9.95 | 85% | 79% | 73% |
| 17 | 1 | 9.95 | 66% | 59% | 52% |
| 18 | 1 | 9.95 | 47% | 39% | 31% |
| 19 | 1 | 9.95 | 28% | 19% | 10% |
| 19 | 2 | 9.95 | 128% | 119% | 110% |

FIG. 19A

| | | | | | |
|---|---|---|---|---|---|
| 20 | 2 | 9.95 | 109% | 99% | 89% |
| 21 | 2 | 9.95 | 90% | 79% | 68% |
| 22 | 2 | 9.95 | 71% | 59% | 47% |
| 23 | 2 | 9.95 | 52% | 39% | 26% |
| 24 | 2 | 9.95 | 33% | 19% | 5% |
| 24 | 0 | 24.9 | 117% | 118% | 119% |
| 25 | 0 | 24.9 | 98% | 98% | 98% |
| 26 | 0 | 24.9 | 79% | 78% | 77% |
| 27 | 0 | 24.9 | 60% | 58% | 56% |
| 28 | 0 | 24.9 | 41% | 38% | 35% |
| 29 | 0 | 24.9 | 22% | 18% | 14% |

FIG. 19B

SYSTEM, PRINTING APPARATUS, AND METHOD FOR MANAGING CONSUMABLE MATERIAL WITHOUT MEASURING ACTUAL REMAINING AMOUNT OF CONSUMABLE MATERIAL

REFERENCE TO RELATED APPLICATIONS

This application claims priority from Japanese Patent Application No. 2021-199995 filed on Dec. 9, 2021. The entire content of the priority application is incorporated herein by reference.

BACKGROUND ART

Heretofore, a technology has been known in which the sum of a remaining amount of ink in a sub tank and a capacity of an ink cartridge is set as a new remaining amount of ink when the ink cartridge attached to a printer has been replaced with a new one, and a consumed amount of ink is estimated based on the new remaining amount of ink in order to determine whether to order a next new ink cartridge.

DESCRIPTION

In the known technology, a next new cartridge is ordered in response to the remaining amount of ink as a printing consumable material in the sub tank decreasing to a particular value. Thereby, it is possible to certainly deliver the next cartridge to the user before the ink for printing runs out completely. In addition, a sensor is disposed in the sub tank to measure an actual remaining amount of ink in the sub tank. Therefore, even though there is an error in the estimated value of the consumed amount of ink, it is possible to automatically reset the estimated value based on the actual remaining ink amount detected by the sensor.

On the other hand, in relatively low-cost printers, a printing consumable material may be supplied in units of a predetermined volume to a tank from a reservoir (e.g., a bottle) that stores therein the predetermined volume of printing consumable material. In such cases, a sensor to measure an actual remaining amount of printing consumable material in the tank as in the known technology may not be provided in the tank.

Furthermore, in practice, the rate of increase in the consumed amount of printing consumable material with an increase in printing quantity varies among individual printers, even of the same model, depending on factors such as individual differences, printing environments, and printing modes. Therefore, the estimated value of the remaining amount of printing consumable material always contains some error, thereby reducing the accuracy of the estimated value. Thus, since it is not possible to accurately determine when to order a next new reservoir, there may be cases where it is difficult to certainly deliver the next reservoir to the user before the printing consumable material runs out.

Aspects of the present disclosure are advantageous to provide one or more improved techniques that make it possible to certainly deliver a next reservoir to a user before a consumable material for printing runs out, even when a sensor to measure an actual remaining amount of consumable material is not provided in a tank.

According to aspects of the present disclosure, a system is provided, which includes a tank and a print engine. The tank is configured to store therein a consumable material for printing supplied in units of a predetermined volume from a reservoir, without any detector to detect an actual remaining amount of the consumable material in the tank. The print engine is configured to perform image formation on a printing medium using the consumable material in the tank. The system further includes a cumulative consumption amount obtainer configured to obtain a cumulative consumption amount of the consumable material used for the image formation by the print engine. The system further includes a bottle capacity obtainer configured to obtain the predetermined volume corresponding to a capacity of the reservoir. The system further includes a number-of-bottle-ordering-times obtainer configured to obtain an order count representing how many times an order for the reservoir has been heretofore placed. The system further includes a correction value obtainer configured to obtain a consumption error correction value for correcting an individual difference in consumption characteristics for the print engine to consume the consumable material. The system further includes a determiner configured to determine whether to order a new reservoir, based on the cumulative consumption amount of the consumable material, the predetermined volume, the order count, and the consumption error correction value.

According to aspects of the present disclosure, further provided is a printing apparatus that includes a tank, a print engine, and a controller. The tank is configured to store therein a consumable material for printing supplied in units of a predetermined volume from a reservoir, without any detector to detect an actual remaining amount of the consumable material in the tank. The print engine is configured to perform image formation on a printing medium using the consumable material in the tank. The controller is configured to obtain a cumulative consumption amount of the consumable material used for the image formation by the print engine. The controller is further configured to obtain the predetermined volume corresponding to a capacity of the reservoir. The controller is further configured to obtain an order count representing how many times an order for the reservoir has been heretofore placed. The controller is further configured to obtain a consumption error correction value for correcting an individual difference in consumption characteristics for the print engine to consume the consumable material. The controller is further configured to determine whether to order a new reservoir, based on the cumulative consumption amount of the consumable material, the predetermined volume, the order count, and the consumption error correction value.

According to aspects of the present disclosure, further provided is a method implementable on a processor of a system including a tank and a print engine. The tank is configured to store therein a consumable material for printing supplied in units of a predetermined volume from a reservoir, without any detector to detect an actual remaining amount of the consumable material in the tank. The print engine is configured to perform image formation on a printing medium using the consumable material in the tank. The method includes obtaining a cumulative consumption amount of the consumable material used for the image formation by the print engine. The method further includes obtaining the predetermined volume corresponding to a capacity of the reservoir. The method further includes obtaining an order count representing how many times an order for the reservoir has been heretofore placed. The method further includes obtaining a consumption error correction value for correcting an individual difference in consumption characteristics for the print engine to consume the consumable material. The method further includes determining whether to order a new reservoir, based on the cumulative consumption amount of the consumable material, the predetermined volume, the order count, and the consumption error correction value.

FIG. 1 is a functional block diagram schematically showing an overall configuration of a print processing system.

FIG. 2 schematically shows a configuration of a printer included in the print processing system.

FIG. 3B illustrates a basic concept of how to calculate an estimated remaining amount of ink in the tank.

FIG. 4A illustrates a variation in an actual amount of ink consumed among individual printers by using a cumulative consumption index.

FIG. 4B illustrates the variation in the actual amount of ink consumed among individual printers by using an estimated remaining amount.

Figure 9:
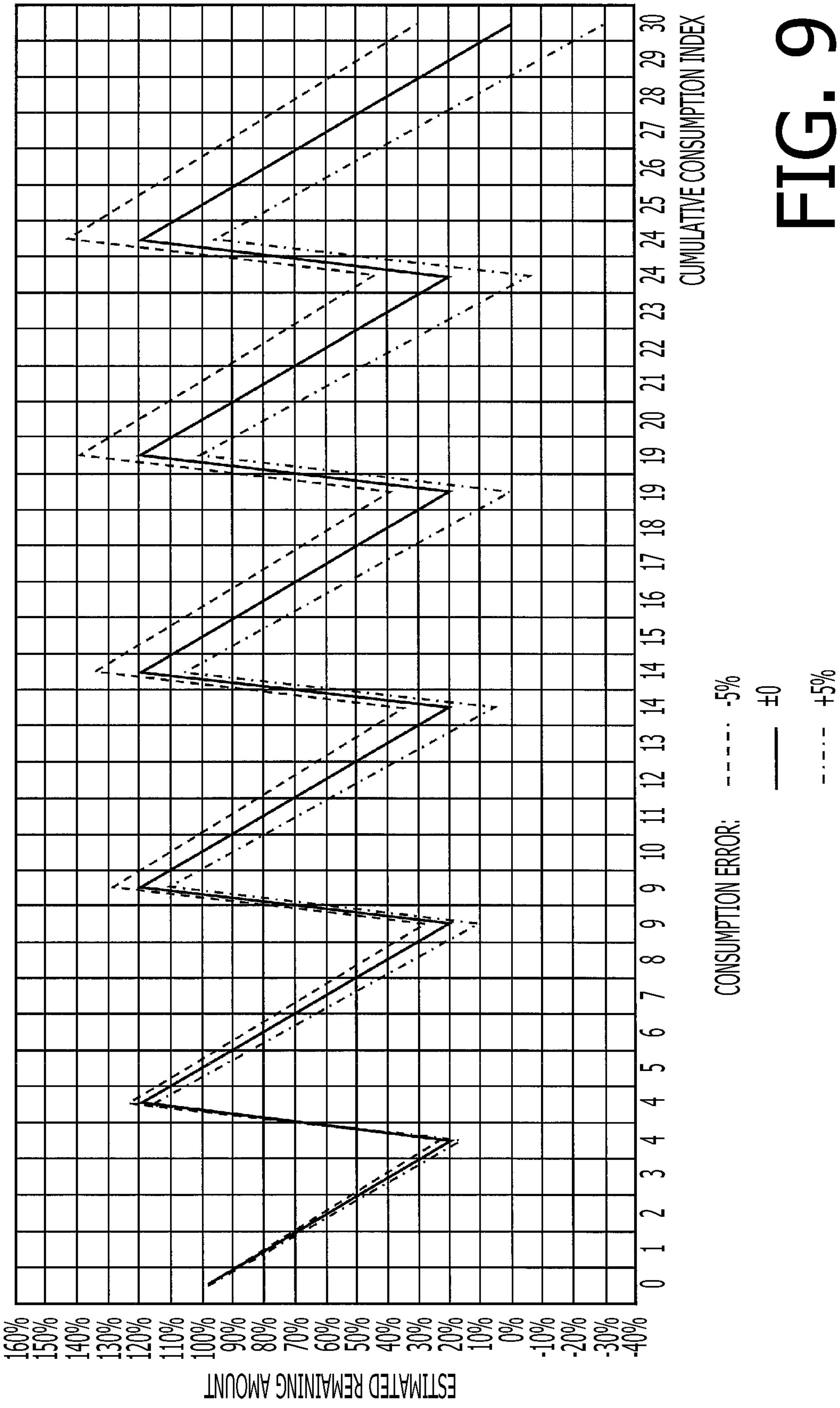

FIGS. 8A, 8B, and 9 show an example of a transition of the estimated remaining amount calculated without using a consumption error coefficient.

Figure 11:
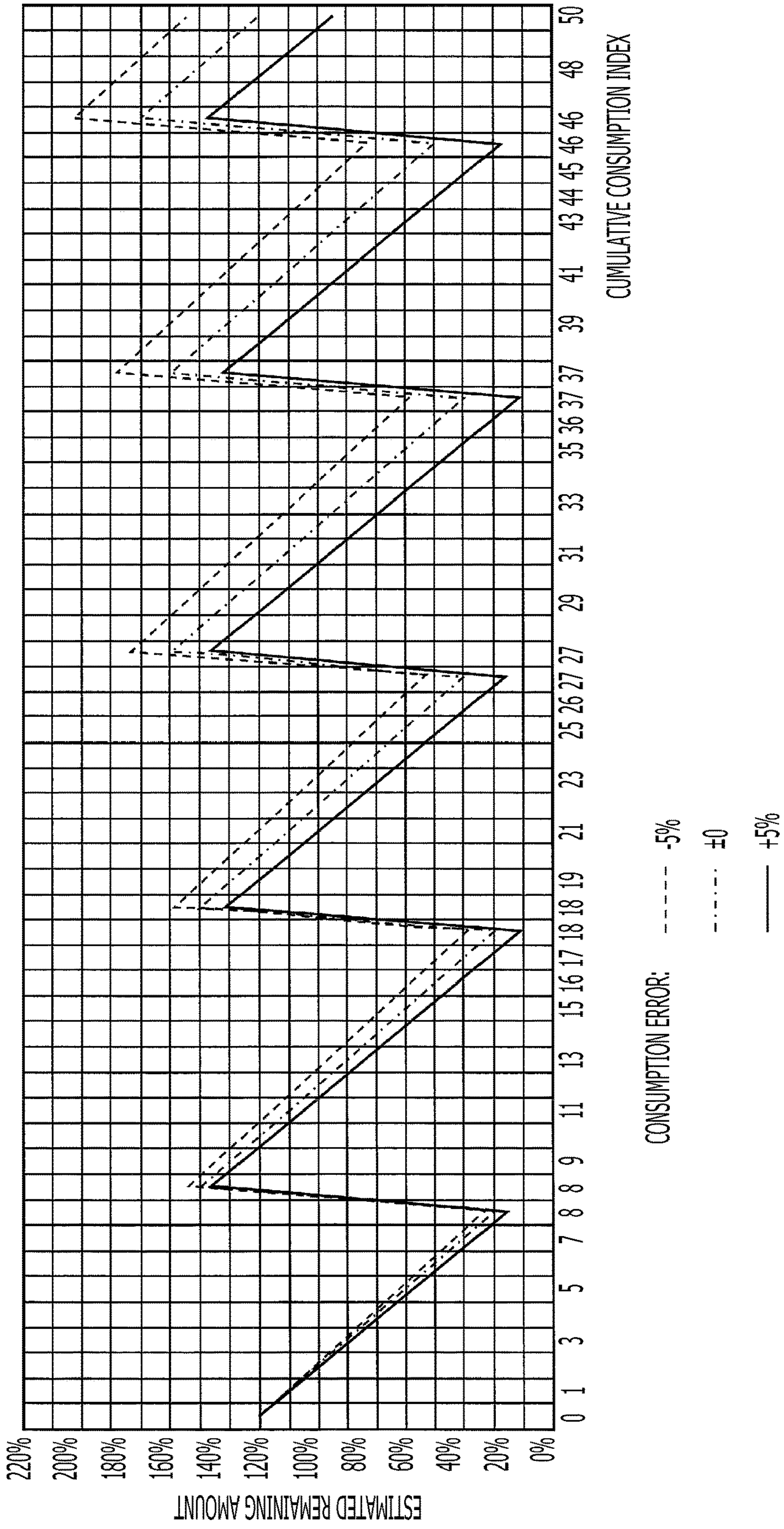

FIGS. 10A, 10B, and 11 are for illustrating how to calculate the estimated remaining amount using the consumption error coefficient.

FIG. 12A shows an example of the transitions of the estimated remaining amount and a physical remaining amount when ink is spilled during ink supply from a new bottle into the tank.

FIG. 12B shows an example of the transition of the estimated remaining amount when the ink spilled during the ink supply is compensated for.

Figure 13:
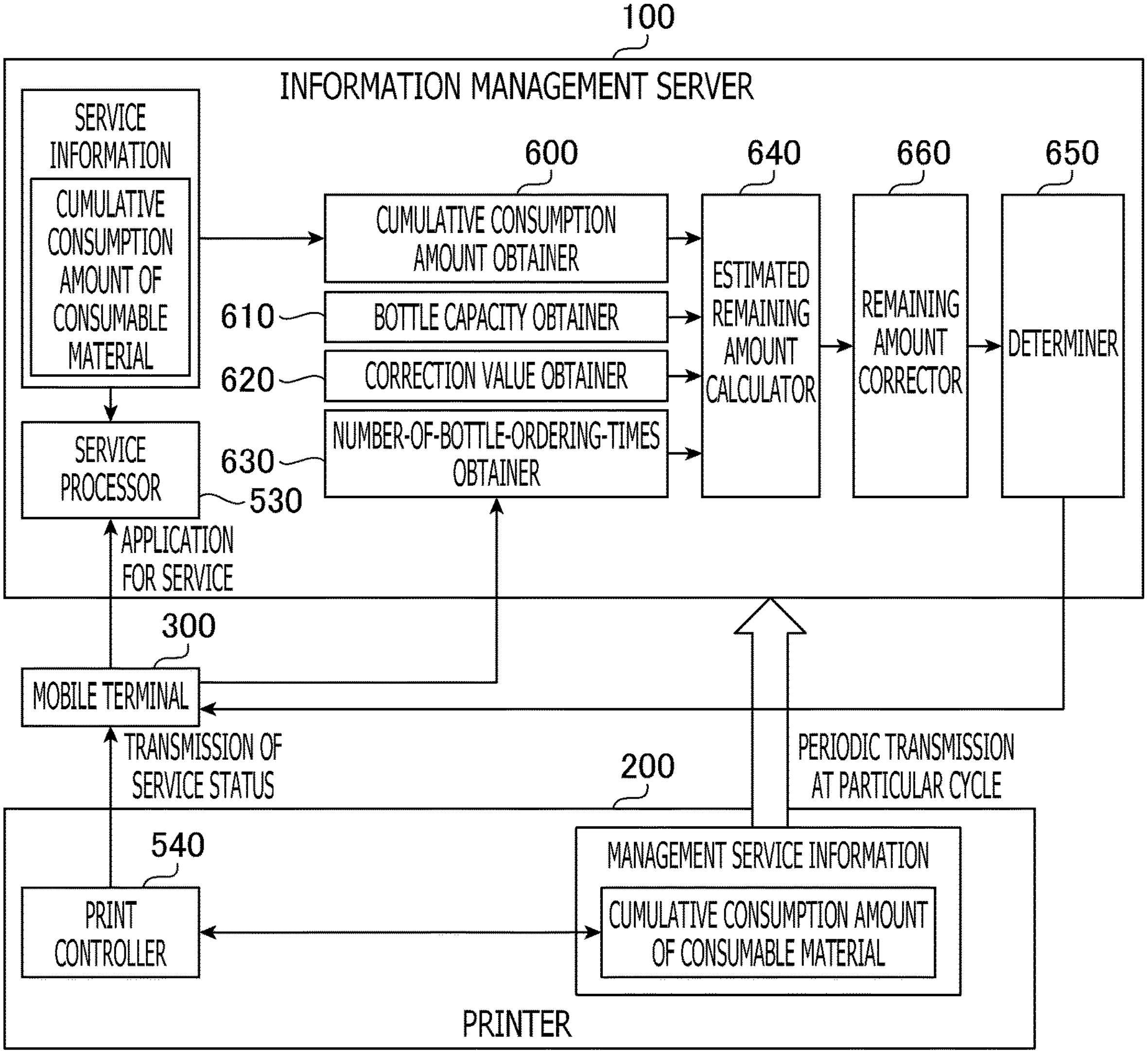

FIG. 13 is a software block diagram of a print processing system to compensate for the ink spilled during the ink supply.

Figure 14:
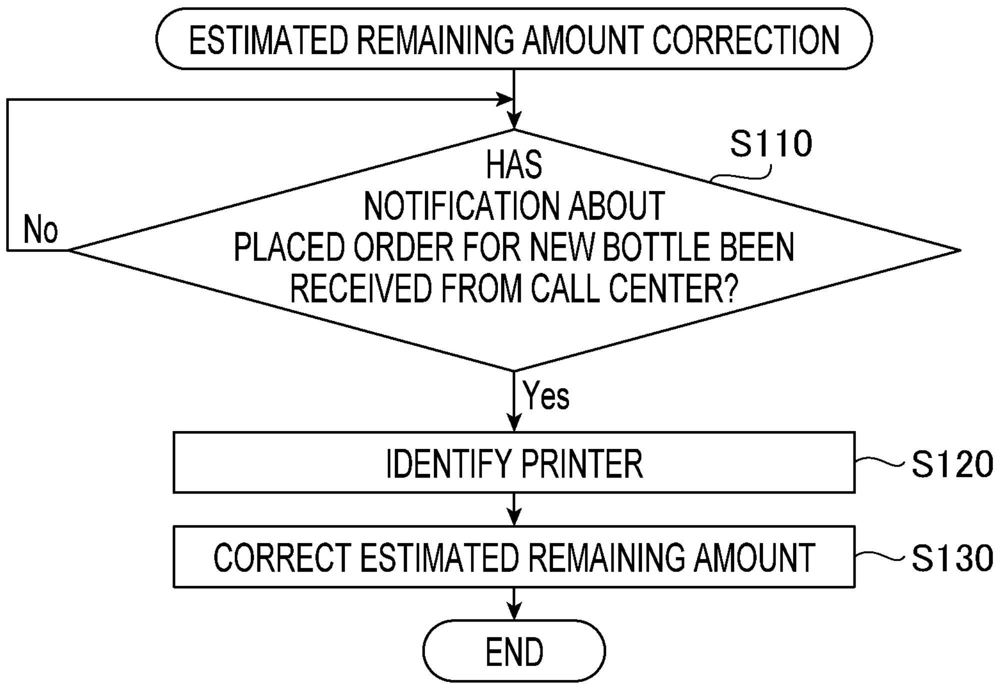

FIG. 14 is a flowchart showing a control procedure to be executed by a remaining amount corrector.

Figure 15:
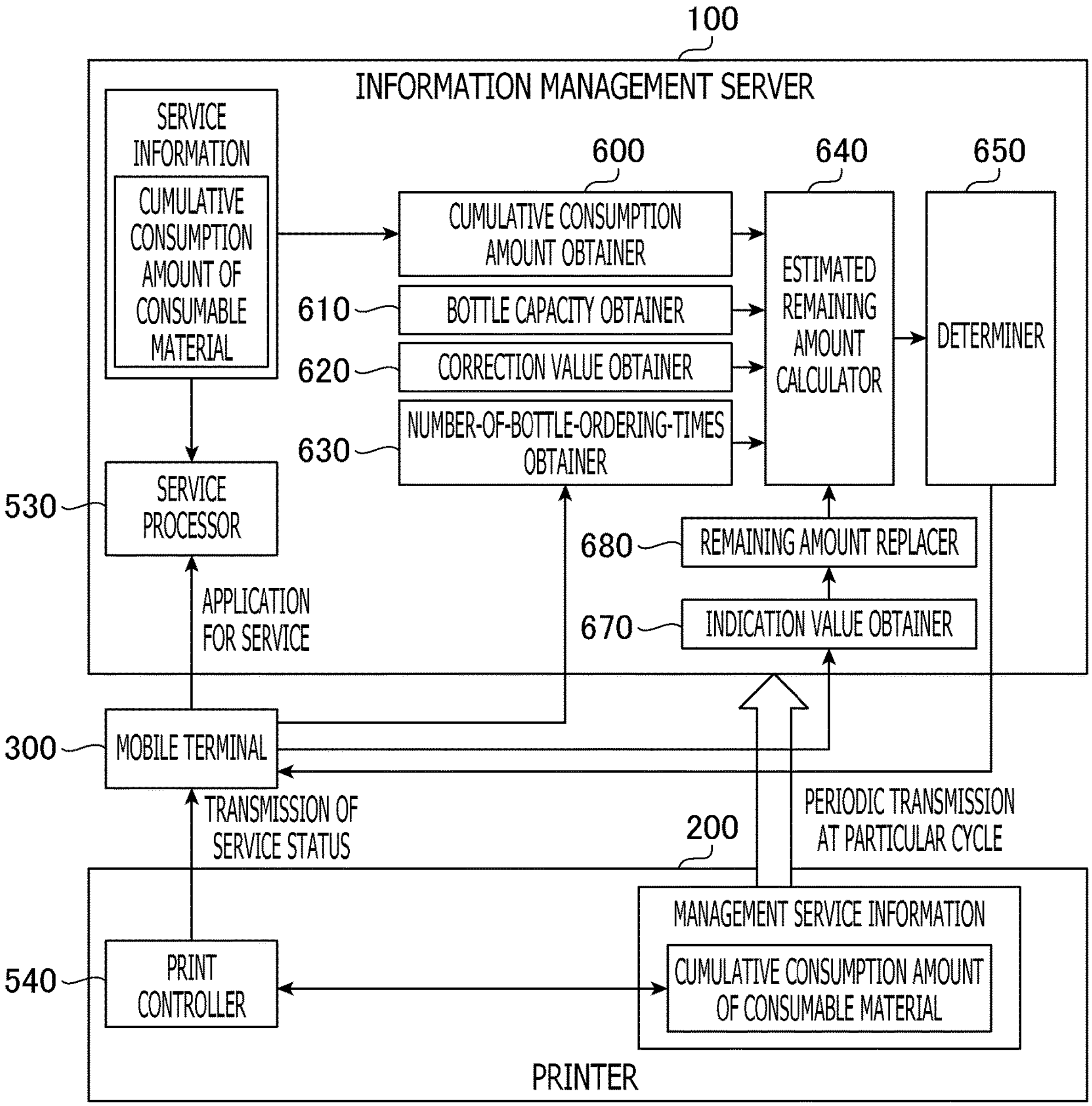

FIG. 15 is a software block diagram of a print processing system to replace the estimated remaining amount with a user-specified indication value.

Figure 17:
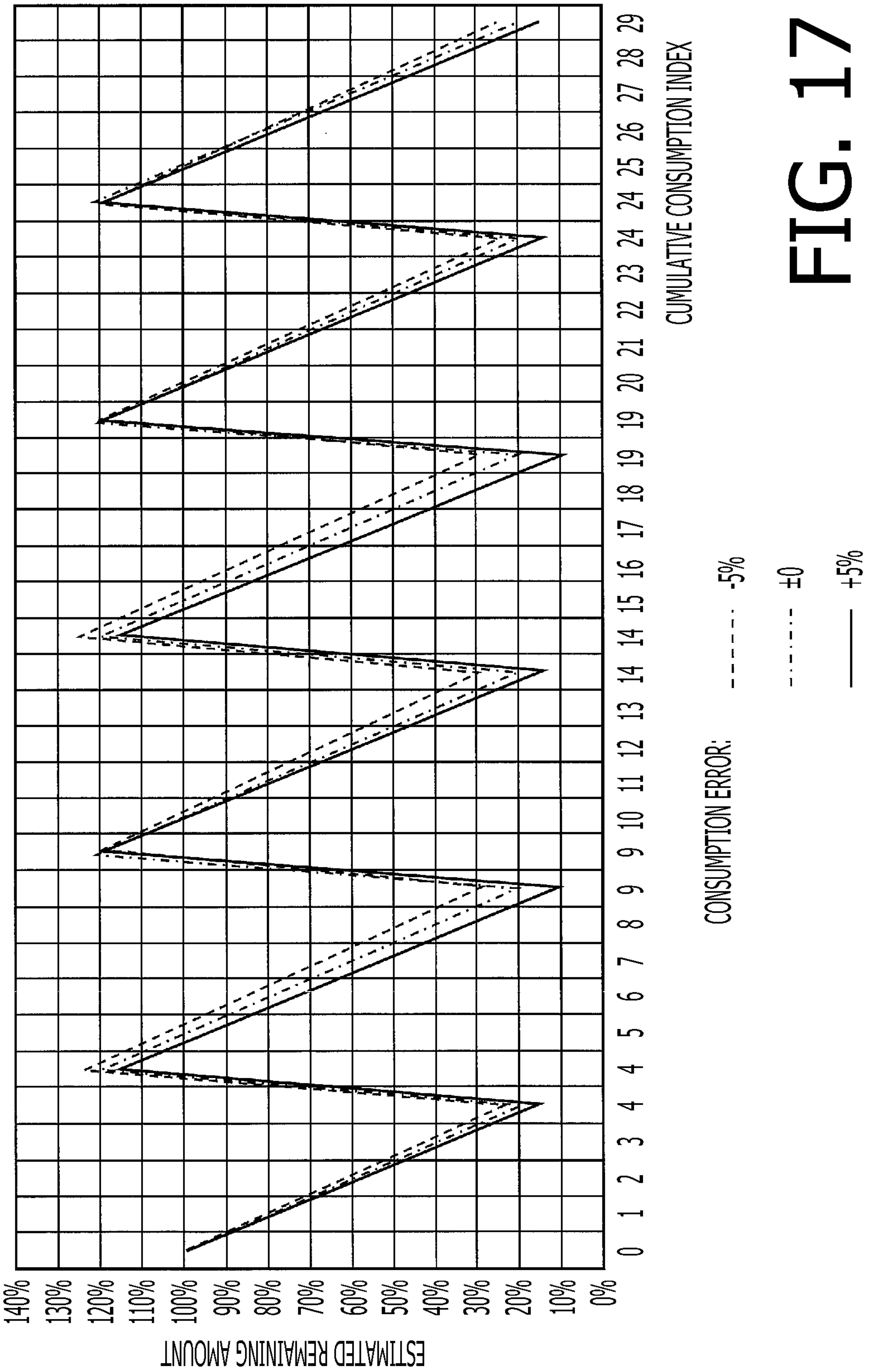

FIGS. 16A, 16B, and 17 show an example of the transition of the estimated remaining amount calculated by the print processing system shown in FIG. 15.

Figure 18:
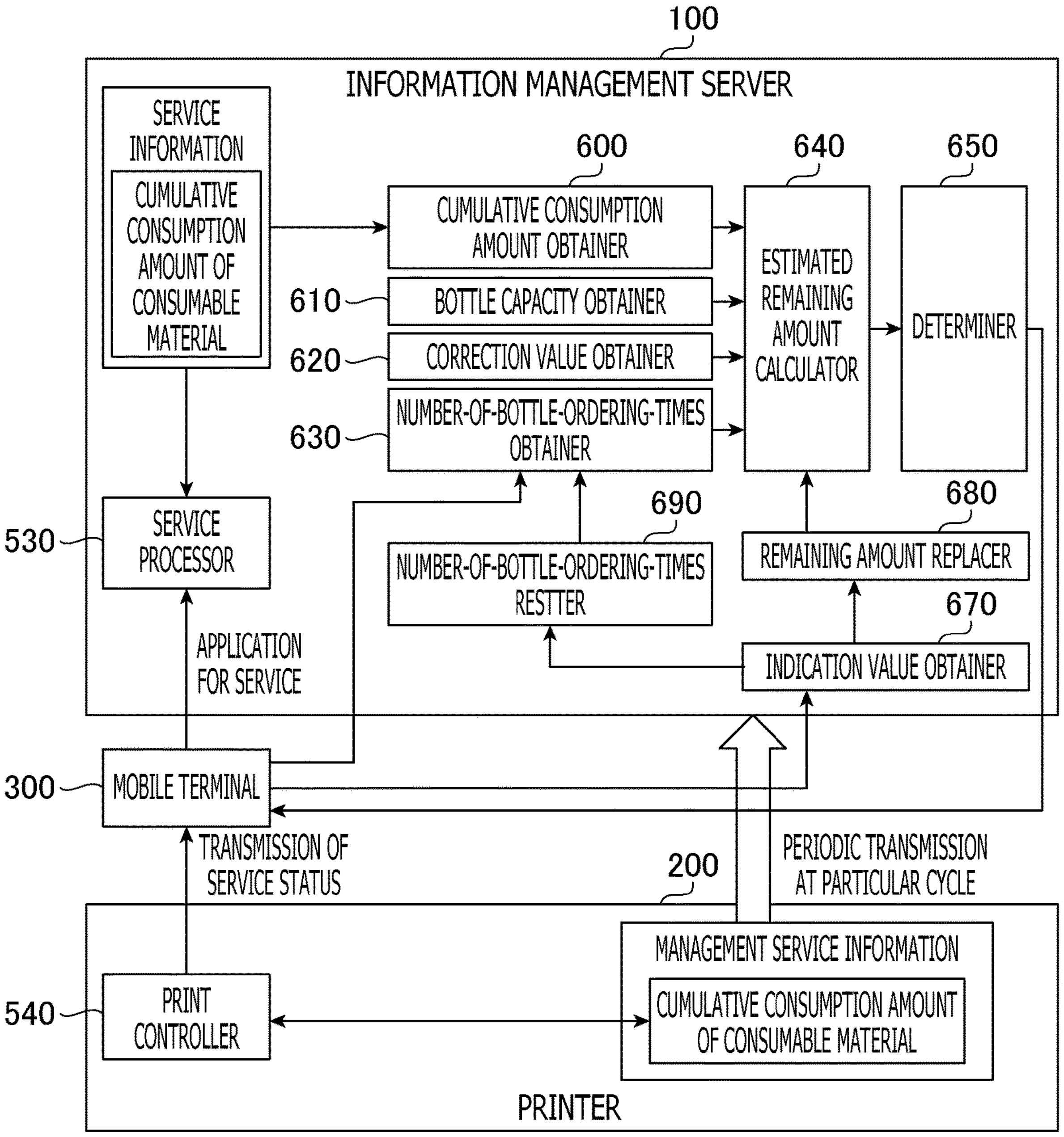

FIG. 18 is a software block diagram of a print processing system to reset the number of bottle ordering times.

Figure 20:
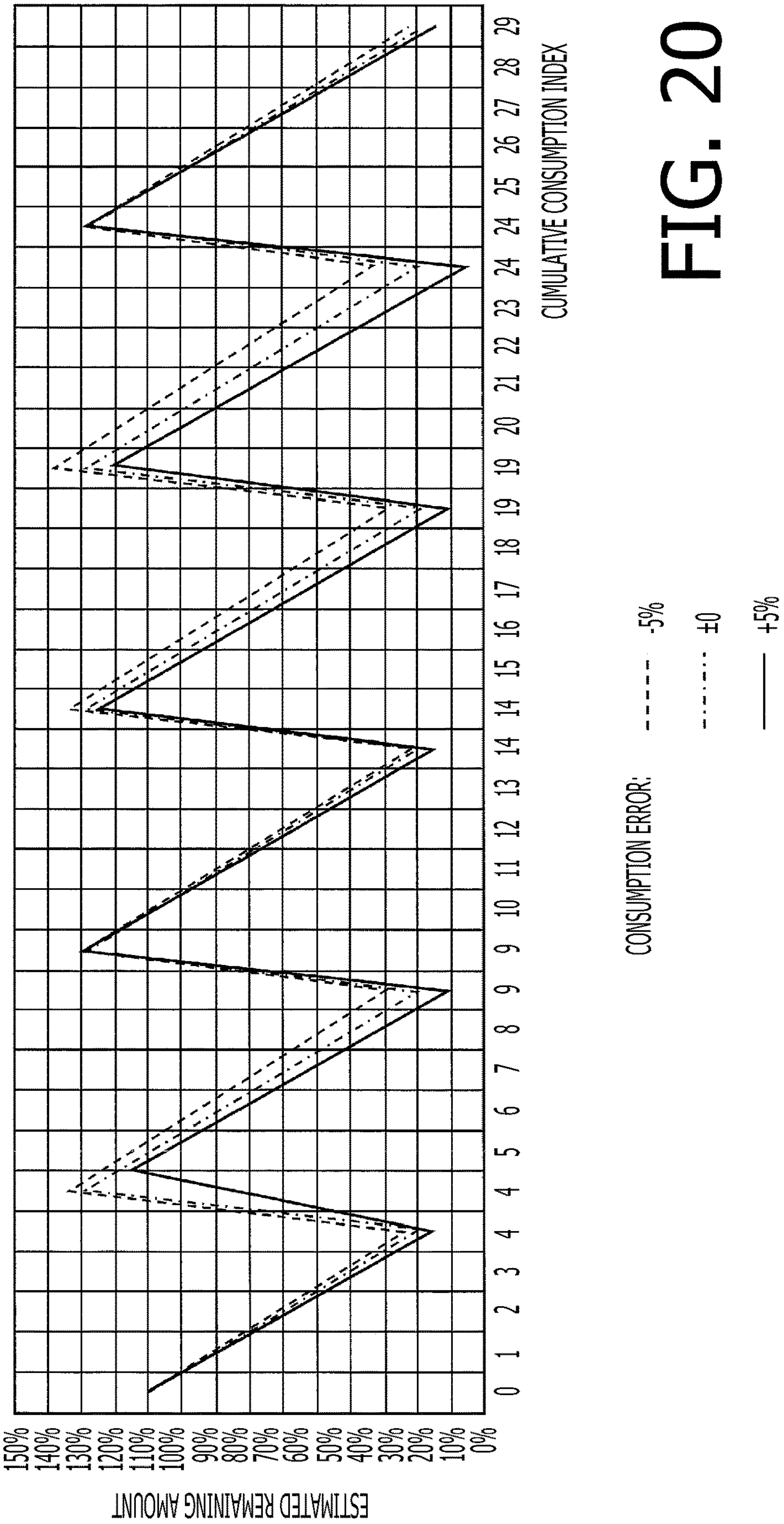

FIGS. 19A, 19B, and 20 show an example of the transition of the estimated remaining amount calculated by the print processing system shown in FIG. 18.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

Figure 1:
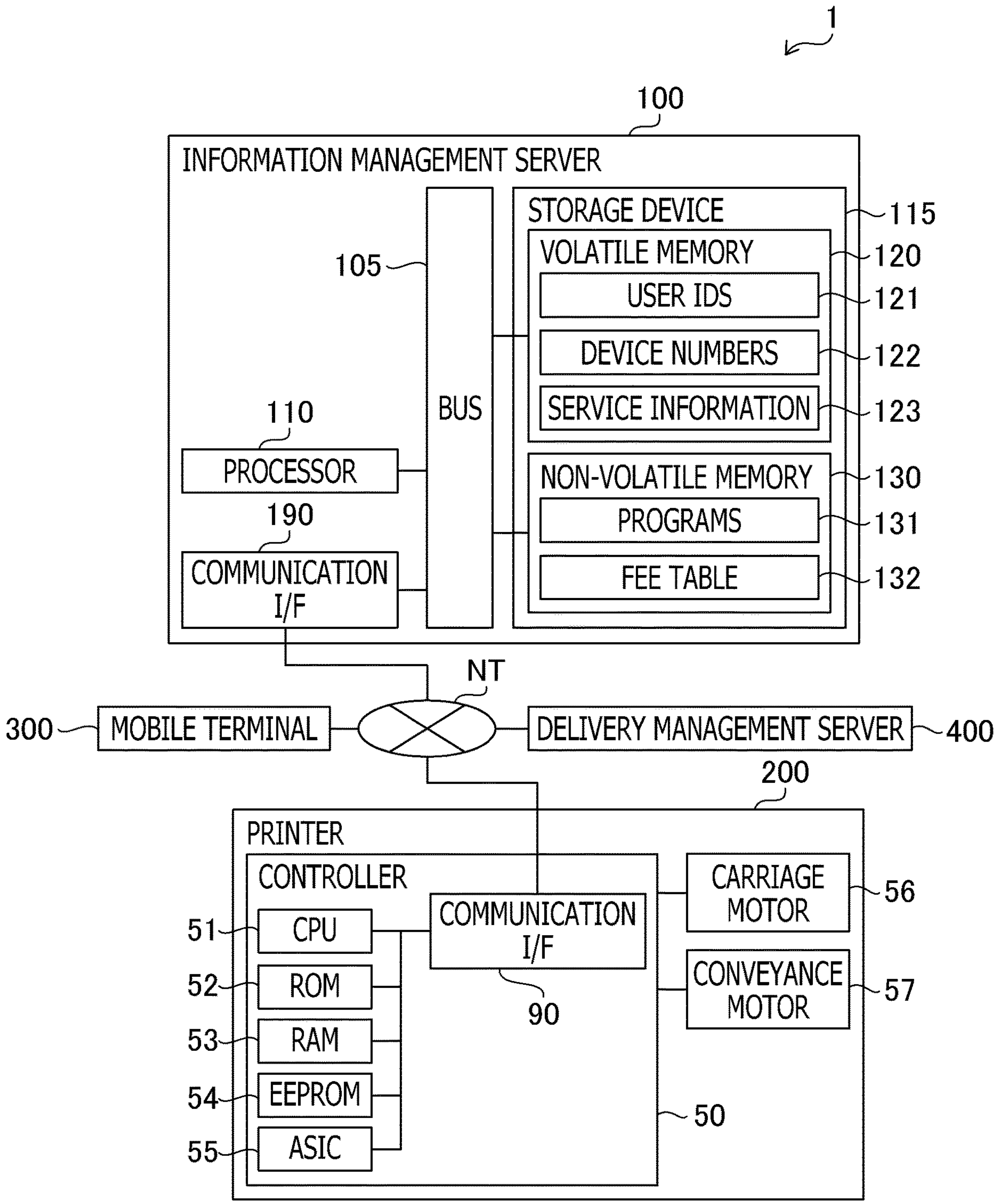

FIG. 1 is a block diagram showing an electrical configuration of a print processing system 1 in an illustrative embodiment according to aspects of the present disclosure. The print processing system 1 is configured to provide a delivery service in which manually-replaceable printing consumable material (of which details will be described below) used in a printer 200 is delivered when the printing consumable material is consumed to a certain degree. The print processing system 1 may be configured to provide a printing service based on a printing contract in which a billing amount is charged according to the number of sheets printed by the printer 200.

Overview of Print Processing System

As shown in FIG. 1, the print processing system 1 includes an information management server 100, at least one printer 200, a mobile terminal 300, and a delivery management server 400. The information management server 100, the at least one printer 200, the mobile terminal 300, and the delivery management server 400 are communicably interconnected via a network NT.

Configuration of Printer

Figure 2:
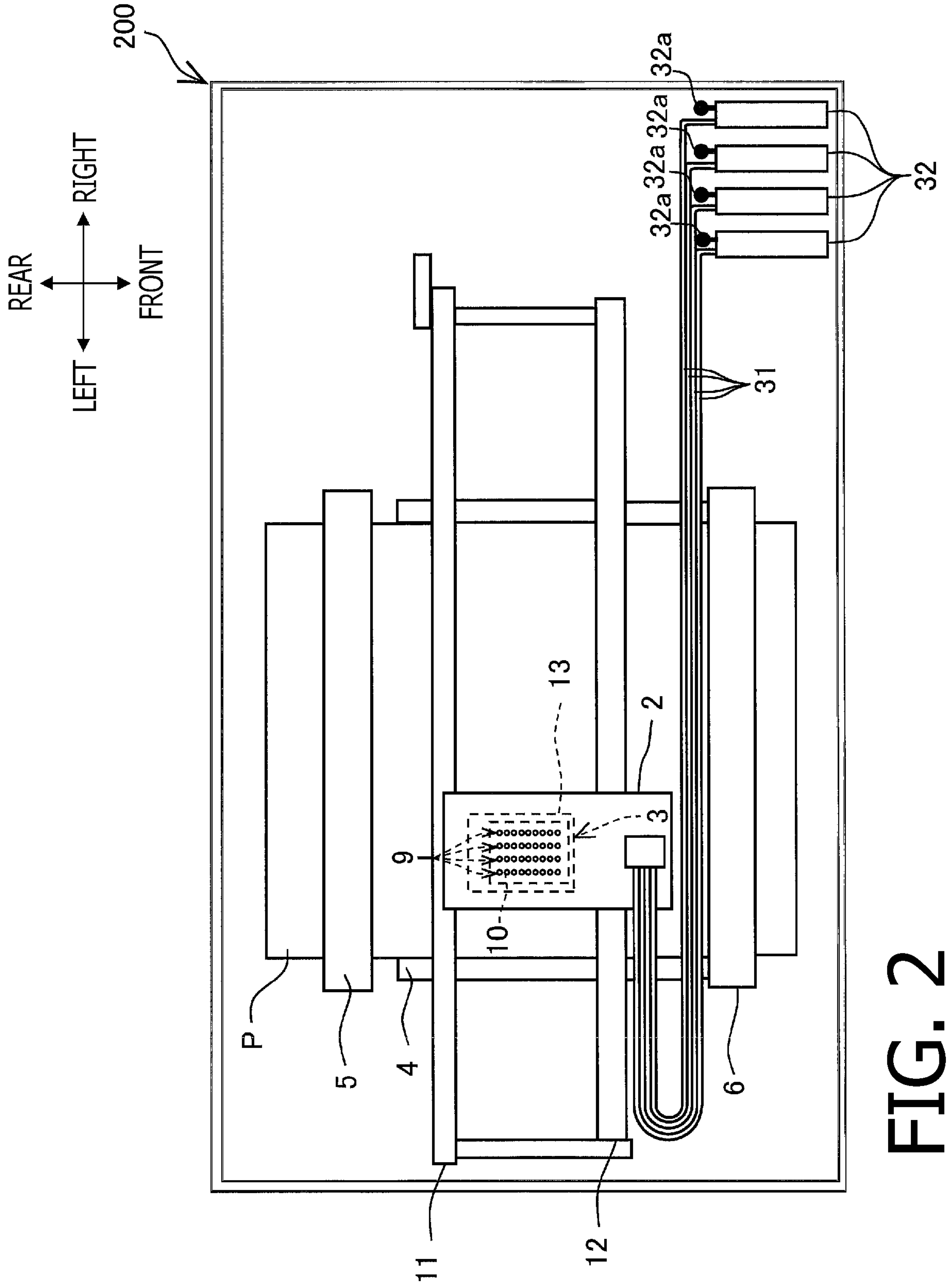

The printer 200 included in the print processing system 1 will be described with reference to FIG. 2. As shown in FIG. 2, the printer 200 includes a carriage 2, an inkjet head 3, a platen 4, and conveyance rollers 5 and 6. It is noted that hereinafter, the elements pertaining to image formation by the printer 200, such as the carriage 2 and the inkjet head 3, may be collectively referred to as an example of "print engine." In the illustrative embodiment, a front side of the printer 200 is defined as a side at which the conveyance roller 6 is disposed. Further, a rear side of the printer 200 is defined as a side at which the conveyance roller 5 is disposed. In addition, a conveyance direction is defined as a direction from the rear side toward the front side. A main scanning direction is along a left-right direction.

The carriage 2 is connected with a carriage motor 56 (see FIG. 1) via a belt (not shown). The carriage 2 is configured to, when driven by the carriage motor 56, reciprocate in the main scanning direction along guide rails 11 and 12.

The inkjet head 3 is connected with four tubes 31. The four tubes 31 are connected with four tanks 32, respectively. The four tanks 32 are arranged along the main scanning direction at a front right portion of the printer 200. The four tanks 32 stores black ink, yellow ink, cyan ink, and magenta ink, respectively. The four types (colors) of inks are supplied to the inkjet head 3 via the four tubes 31, respectively.

The printer 200 of the illustrative embodiment is a relatively low-cost model. In the printer 200 of such a low-cost model, ink is fed into each tank 32 from a corresponding bottle (not shown). Specifically, each tank 32 is provided with a cap 32*a*. Each tank 32, with the cap 32*a* removed therefrom, is filled with ink supplied from the corresponding bottle by a manual feeding operation. For instance, the bottle has a capacity of a predetermined fixed volume. Unless ink is accidentally spilled during the manual feeding operation as will be described below, or unless ink is fed into the tank 32 in a state where the tank 32 is unable to accept all the ink supplied from the bottle, in principle, the ink is fed into the tank 32 from the bottle in units of the above predetermined volume by a single feeding operation. Moreover, the printer 200 of the low-cost model as mentioned above has no sensor to measure an actual remaining amount of ink in each tank 32.

The inkjet head 3 is mounted on the carriage 2. The printer 200 is configured to perform image formation (i.e., printing) by causing the inkjet head 3 to eject ink while moving the carriage 2 with the inkjet head 3 mounted thereon along the main scanning direction. The inkjet head 3 has a flow channel unit 13 and actuators (not shown).

The flow channel unit 13 has four nozzle rows 9 arranged along the main scanning direction. Each nozzle row 9 includes a plurality of nozzles 10 arranged along the conveyance direction. For instance, the plurality of nozzles 10 are configured to eject therefrom black ink, yellow ink, cyan ink, and magenta ink in order from right to left. The plurality of nozzles 10 included in each single nozzle row 9 are supplied with ink of a corresponding one of the four colors via one common tube 31 and one common ink channel. Namely, ink from each single tank 32 is supplied through a pathway of the corresponding tube 31→the corresponding flow channel of the flow channel unit 13→each corresponding nozzle 10.

The platen 4 is disposed below the inkjet head 3, and faces a nozzle surface (not shown) during the printing. The platen 4 extends over the full width of a recording sheet P in the main scanning direction. The platen 4 is configured to support the recording sheet P from below. The conveyance rollers 5 and 6 are disposed upstream and downstream of the platen 4 in the conveyance direction, respectively. The conveyance rollers 5 and 6 are connected with a conveyance motor 57 (see FIG. 1) via gears (not shown). The conveyance rollers 5 and 6 are driven to rotate by the conveyance motor 57, thereby conveying the recording sheet P in the conveyance direction.

With the above configuration, the printer 200 performs printing on the recording sheet P by causing the inkjet head 3 to eject ink from the plurality of nozzles 10 while moving the carriage 2 in the main scanning direction each time the recording sheet P is conveyed over a particular distance by the conveyance rollers 5 and 6.

Electrical Configuration of Print Processing System

Referring back to FIG. 1, an electrical configuration of the print processing system 1 will be described.

Information Management Server

The information management server 100 is, for instance, a server installed and managed by a manufacturer of the printer 200. The information management server 100 includes a processor 110, a storage device 115, and a communication I/F ("I/F" is an abbreviation for "interface") 190. The processor 110, the storage device 115, and the communication I/F 190 are interconnected via a bus 105.

The storage device 115 includes a volatile memory 120 and a non-volatile memory 130. For instance, the volatile memory 120 includes a DRAM. The volatile memory 120 has a user ID storage area 121, a device number storage area 122, and a service information storage area to store after-mentioned service information. For instance, the non-volatile memory 130 includes at least one of a hard disk drive and a solid state drive. The non-volatile memory 130 has a program storage area 131 and a fee table storage area 132. For instance, the fee table storage area 132 stores particular correlations for calculating fees charged to the user for services such as printing and bottle delivery.

The processor 110 is a data processing device, e.g., a CPU. The processor 110 is configured to execute programs stored in the program storage area 131, thereby performing various types of processing including data communication with the mobile terminal 300, the printer 200, and the delivery management server 400 via the network NT, and after-mentioned processes shown in FIGS. 7 and 14.

The communication I/F 190 includes at least one of a wired LAN I/F and a wireless I/F to communicate with other devices. The communication I/F 190 is connected with the network NT.

Delivery Management Server

The delivery management server 400 is installed, for instance, in a delivery service company that provides delivery services for various goods. The delivery management server 400 includes a processor (not shown), a storage device (not shown), and a communication I/F (not shown) for connecting with the network NT.

Mobile Terminal

For instance, the mobile terminal 300 is a smartphone owned by the user. The mobile terminal 300 is configured to connect with the network NT via wireless communication. The mobile terminal 300 includes a processor, a storage device, a communication I/F for connecting with the network NT, and a display 301 (see FIG. 6). Various programs, including processing programs, are stored in a program storage area provided in the storage device. Instead of the mobile terminal 300, other information terminals such as a personal computer and a tablet computer may be used. Hereinafter, as appropriate, those information terminals (including the mobile terminal 300) may be collectively referred to simply as "information terminals 300."

Printer

The printer 200 includes a controller 50 to control operations of the printer 200. The controller 50 includes a CPU 51, a ROM 52, a RAM 53, an EEPROM 54, an ASIC ("ASIC" is an abbreviation for "Application Specific Integrated Circuit") 55, and a communication I/F 90. The controller 50, which includes the above elements, is enabled to control the carriage motor 56 and the conveyance motor 57. Further, various programs executable by the CPU 51 may be stored in the ROM 52 and/or the EEPROM 54.

The communication I/F 90 includes at least one of a wired LAN I/F and a wireless I/F to communicate with other devices, and is connected with the network NT.

FIG. 1 shows only one CPU 51. However, the controller 50 may include a plurality of CPUs 51, which may share the processing with each other. Further, FIG. 1 shows only one ASIC 55. However, the controller 50 may include a plurality of ASICs 55, which may share the processing with each other.

Background of Illustrative Embodiment

Figure 3A:
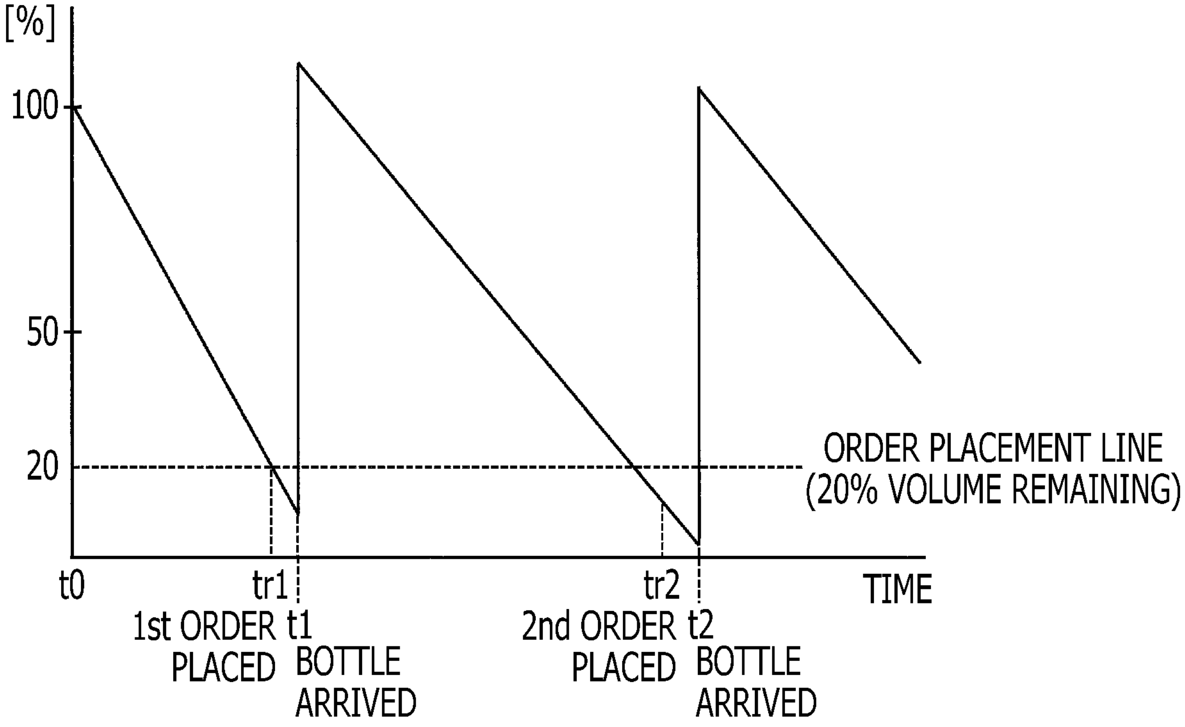
FIG. 3A illustrates a transition of a remaining amount of ink in a tank when ink is additionally supplied from an ordered new bottle into the tank each time the remaining amount of ink runs lower than a threshold.

In the printer 200, for instance, if a new bottle is ordered when the remaining amount of ink in a tank 32 decreases to a particular value, it is possible to certainly deliver the ordered new bottle to the user before the ink usable for printing runs out completely. The new bottle delivered via the order contains a predetermined fixed volume of ink, and ink is supplied from the bottle to the tank in units of the fixed volume. The fixed volume is a value that is uniquely determined for one bottle of a certain type. However, there may be a plurality of different types of bottles usable in the printer 200. In this case, a plurality of different values may exist as the fixed volume. Further, in this case, the bottle may be switched to another type of bottle while the printer 200 is in operation. Referring to FIGS. 3A and 3B, an explanation will be provided, for instance, of an example of the behavior of the remaining amount of ink in a tank 32 changing over time in a case where a new bottle is ordered in response to the remaining amount of ink in the tank 32 reaching 20% of the fixed volume.

FIG. 3A shows the passage of time (T) on the horizontal axis and the remaining amount (%) of ink in the tank 32 on the vertical axis. In the example shown in FIG. 3A, ink of the above fixed volume is first fed into the empty tank 32 from a bottle, and the user starts using the ink (T=t0) from a state where the remaining amount of ink in the tank 32 is 100%, i.e., the same amount as the above fixed volume. A first order for a bottle is placed in response to the remaining amount of ink in the tank 32 gradually decreasing due to an increase in the number of printed sheets as a result of the user's usage of the printer 200 and becoming equal to or lower than 20% of the fixed volume (T=tr1). Hereinafter, such an expression as "20% of the fixed volume" may be referred to simply as "20% volume." There is some time lag from when the order has been placed until when the ordered new bottle is actually delivered and arrives. As a result, when the bottle has arrived at the user's location, the remaining amount of ink in the tank 32 is reduced to about 10% volume (T=t1).

When ink of the fixed volume is fed into the tank 32 from the bottle that has arrived at the user's location, the remaining amount of ink in the tank 32 increases to about 110% volume (T=t1). In substantially the same manner as above, a second order for a bottle is placed in response to the remaining amount of ink in the tank 32 decreasing again due to the increase in the number of printed sheets and becoming equal to or lower than 20% volume. In this example, the second order has been placed a little later, specifically, at the timing when the remaining amount of ink in the tank 32 has become about 12% volume (T=tr2). As a result, when the bottle has arrived at the user's location, the remaining amount of ink in the tank 32 is reduced to about 3% volume (T=t2).

When ink of the fixed volume is again fed into the tank 32 from the bottle that has arrived at the user's location, the remaining amount of ink in the tank 32 increases to about 103% volume (T=t2). Afterward, in substantially the same manner as above, the remaining amount of ink in the tank 32 decreases again due to the increase in the number of printed sheets.

Calculation of Estimated Remaining Amount

As described above, when the user attempts to order a new bottle in response to the remaining amount of ink in the tank 32 becoming a particular value (e.g., 20% volume), it is not possible to accurately measure the particular value since the printer 200 has no sensors to measure an actual remaining amount of ink in the tank 32. Therefore, in the illustrative embodiment, for instance, a method is employed to estimate the remaining amount of ink in the tank 32 by calculating a cumulative consumed ink amount and subtracting the calculated cumulative consumed ink amount from the fixed volume multiplied by the number of times that the bottle has been ordered in the past. In this case, the cumulative consumed ink amount may be calculated by determining a cumulative amount of the consumable material consumed for each printing operation based on a dot count value of the printer 200 and accumulating the determined cumulative amount of the consumable material consumed for each printing operation. FIG. 3B shows estimated values of the remaining amount of ink in the tank 32 using this method. Hereinafter, as appropriate, the estimated values of the remaining amount of ink in the tank 32 may be referred to simply as the "estimated remaining amount." In FIG. 3B, the cumulative consumption amount (i.e., the cumulative amount of the consumable material consumed) is represented using a cumulative consumption index corresponding to an actual consumed ink amount, for instance, expressed in picoliters. The cumulative consumption index corresponds one-to-one to the cumulative number (i.e., the dot count value) of on-dots in the image data at the time of printing. In this example, a value equivalent to 100% volume is indexed as 5, and a value equivalent to 20% volume is indexed as 1. Moreover, the estimated remaining amount is expressed with the fixed volume as 100%. It is noted that in the illustrative embodiment, ink is an example of the printing consumable material. Hereinafter, the printing consumable material may be referred to simply as the consumable material.

As shown in FIG. 3B, at the time T=t0 before the start of the user's usage of the printer 200, the cumulative consumption index is 0, and the number of bottle ordering times at this time is 0. Therefore, the estimated remaining amount calculated as described above is 100% volume. The remaining amount of ink in the tank 32 gradually decreases due to the increase in the number of printed sheets as a result of the user's usage of the printer 200. For instance, when 20% volume, of the ink stored in the tank 32, is consumed, the cumulative consumption index becomes 1, and the estimated remaining amount becomes 80% volume. Further, when 40% volume, of the ink stored in the tank 32, is consumed, the cumulative consumption index becomes 2, and the estimated remaining amount becomes 60% volume. Afterward, when 80% volume, of the ink stored in the tank 32, is consumed, the cumulative consumption index becomes 4, and the estimated remaining amount becomes 20% volume. Therefore, a new bottle is ordered at this time. When the ordered new bottle arrives at the user's location, and 100% volume is additionally fed into the tank 32, the number of bottle ordering times becomes 1, whereas the cumulative consumption index remains at 4. Further, at this time, the estimated remaining amount becomes 120% volume in total after 100% volume from the new bottle is added to 20% volume (see values in the bold frame in FIG. 3B).

Thereafter, as above, when 20% volume, of the ink stored in the tank 32, is consumed, the cumulative consumption index becomes 5, and the estimated remaining amount is reduced by 20% from 120% to 100% volume. Further, when 40% volume, of the ink stored in the tank 32, is consumed, the cumulative consumption index becomes 6, and the estimated remaining amount becomes 80% volume. The same applies thereafter.

Consumption Error

In reality, however, the rate of increase in a consumed amount of ink in the tank 32 for image formation by the inkjet head 3 with an increase in the number of printed sheets varies from one printer to another among the individual printers 200 of the same model. As a result, the estimated value of the remaining amount of ink in the tank 32 always contains a certain amount of error, and it is difficult to estimate the remaining amount of ink in the tank 32 with high accuracy.

For instance, FIG. 4A shows an example case in which there is a ±5% individual variation (i.e., consumption errors) in an actual amount of ink consumed for the increase in the number of printed sheets. A case will be described below in which as shown in FIG. 4A, the cumulative consumption index (more specifically, a standard value of the cumulative consumption index with no consumption error) makes a transition to 1, 2, 3, . . . , due to the increase in the number of printed sheets as a result of the user's usage of the printer 200. In this case, for instance, when the printer 200 is assumed as an individual having a consumption error of −5%, i.e., an individual by which the actual amount of ink consumed is 5% smaller than in the above standard case with no consumption error, the actual cumulative consumption index makes a transition to 0.95, 1.9, 2.85, . . . , which are 5% lower than the above standard values. Further, when the printer 200 is assumed as an individual having a consumption error of +5%, i.e., an individual by which the actual amount of ink consumed is 5% larger than in the above standard case with no consumption error, the actual cumulative consumption index makes a transition to 1.05, 2.1, 3.15, . . . , which are 5% higher than the above standard values. In any case, a deviation from the standard value of the cumulative consumption index, which makes a transition to 1, 2, 3, . . . with no consumption error, increases in proportion to the increase in the cumulative consumption index, making a transition to ±0.05, ±0.1, ±0.15, . . . and so on.

FIG. 4B shows the above transition using the estimated remaining amount. As shown in FIG. 4B, when the cumulative consumption index makes a transition from 0 to 1, 2, 3, . . . , a standard value of the estimated remaining amount with no consumption error makes a transition from 100% volume to 80% volume, 60% volume, 40% volume, . . . and so on. Meanwhile, assuming the printer 200 as an individual having a consumption error of −5%, the actual amount of ink consumed is 5% smaller than in the case of the standard value with no consumption error. Therefore, in this case, the estimated remaining amount makes a transition from 100% volume to 81% volume, 62% volume, 43% volume, . . . , which are higher than the standard values. Further, assuming the printer 200 as an individual having a consumption error of +5%, the actual amount of ink consumed is 5% larger than in the case of the standard value. Therefore, in this case, the estimated remaining amount makes a transition from 100% volume to 79% volume, 58% volume, 37% volume, . . . , which are lower than the standard values.

Adoption of Consumption Error Coefficient

Therefore, it is difficult to accurately determine when to order a next new bottle with the above method as it is, and to certainly deliver the next bottle to the user before the ink in the tank 32 runs out.

Therefore, in the illustrative embodiment, in order to guarantee that the ink will never run out until the ordered bottle arrives, the estimated remaining amount is calculated under an assumption that a consumption error of +5% always exists, for a higher level of safety and certainty. Hence, the above-calculated estimated remaining amount multiplied by a consumption error coefficient of 1.05 is determined as an estimated remaining amount with the consumption error taken into account.

Software Block Configuration

Figure 5:
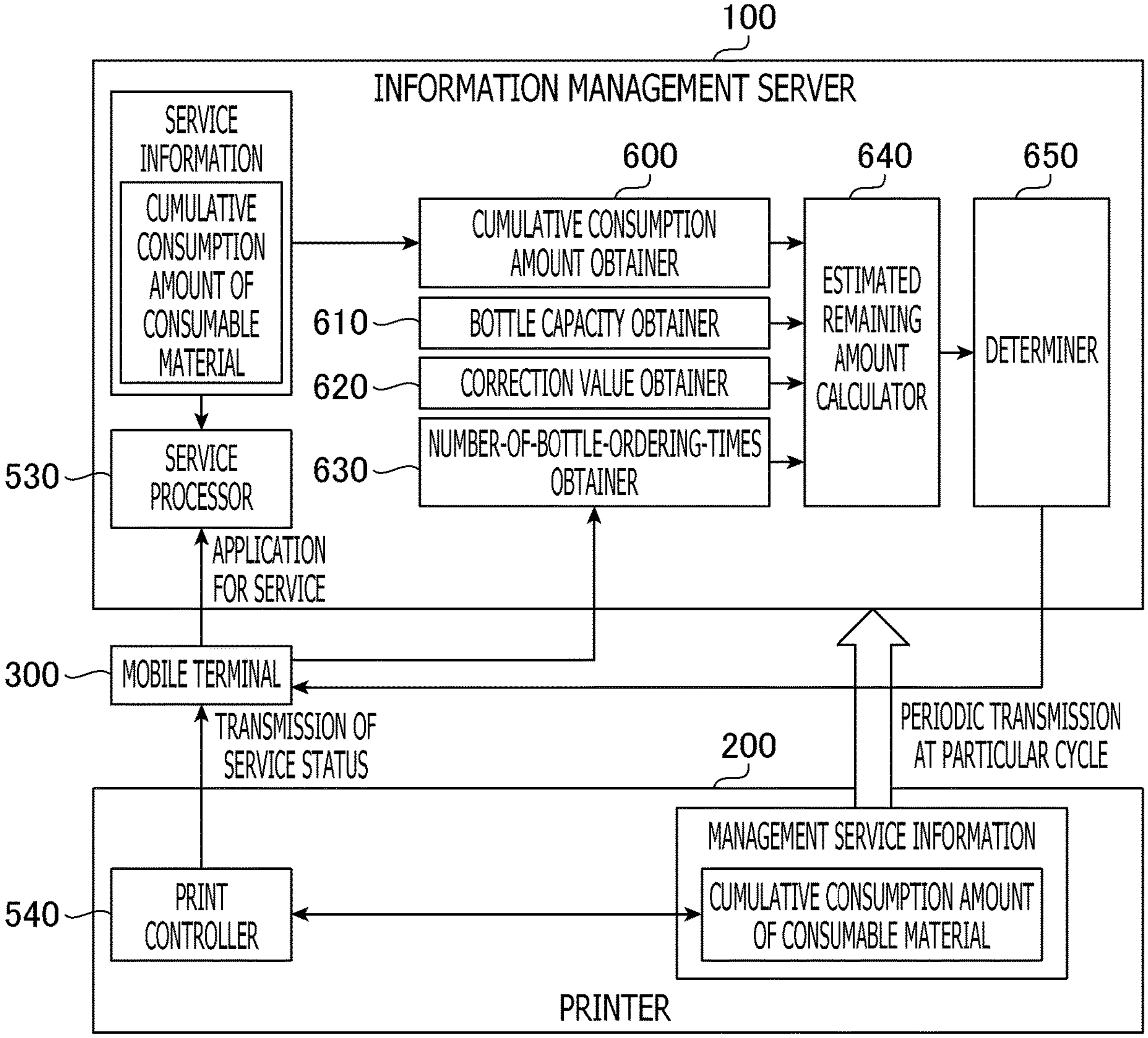
FIG. 5 is a software block diagram of the print processing system.

FIG. 5 shows a software block configuration for executing the aforementioned processes in the illustrative embodiment.

Service Processor of Management Server

In FIG. 5, the information management server 100 includes a service processor 530. For instance, the service processor 530 may be configured with the aforementioned processor 110 and relevant programs stored in the program storage area 131. In other words, the service processor 530 may be achieved by the processor 110 executing relevant programs stored in the program storage area 131.

Print Controller of Printer

The printer 200 includes a print controller 540. For instance, the print controller 540 may be configured with the CPU 51 and relevant programs included in the controller 50. In other words, the print controller 540 may be achieved by the CPU 51 executing relevant programs stored in a non-transitory computer-readable medium such as the ROM 52 and the EEPROM 54.

The service processor 530 of the information management server 100 receives an application for the delivery service and/or the printing service from the user via the information terminal 300, and performs processing necessary for the requested service as appropriate with reference to the latest service information. The service information is stored in a service information storage area 123 in the volatile memory 120 of the information management server 100 shown in FIG. 1. In this example, the service information includes the cumulative consumption amount of the consumable material, the bottle capacity (i.e., 100% of the fixed volume), the number of bottle ordering times (i.e., the number of times that the bottle has been ordered in the past), and the consumption error coefficient for correcting for an individual difference in the consumption error. The service information is backed up in a rewritable non-volatile memory (not shown) as appropriate in such a manner that the service information is not lost when the printer 200 is turned off.

The print controller 540 of the printer 200 is configured to control a printing operation of the inkjet head 3. Management service information, stored in a particular area of the RAM 53 or the EEPROM 54, contains the cumulative consumption amount of the consumable material. The print controller 540 is further configured to send to the information terminal 300 a service status that includes the contents of the management service information at that point of time and to present the service status to the user.

The cumulative consumption amount of the consumable material is a value obtained by accumulating the dot count value that represents an actual amount of ink consumed through printing by the printer 200. Data of the cumulative consumption amount of the consumable material is generated and modified by the print controller 540. When printing is actually performed by the inkjet head 3, the print controller 540 counts up the cumulative consumption amount of the consumable material in the management service information by the number of sheets that have been printed in the printing, thereby updating the cumulative consumption amount of the consumable material. The printer 200 sends the counted-up cumulative consumption amount of the consumable material and identification information such as the device number of the printer 200 to the information management server 100 as appropriate, for instance, periodically at a particular cycle. The information management server 100 updates the cumulative consumption amount of the consumable material included in the service information based on the information received from the printer 200. The information management server 100 stores in the device number storage area 122 the device number of the printer 200 that has sent the cumulative consumption amount of the consumable material, in association with the cumulative consumption amount of the consumable material.

Other Functional Units of Management Server

The information management server 100 further includes a cumulative consumption amount obtainer 600, a bottle capacity obtainer 610, a correction value obtainer 620, a number-of-bottle-ordering-times obtainer 630, and an estimated remaining amount calculator 640, and a determiner 650. For instance, each of the above elements 600, 610, 620, 630, 640, and 650 of the information management server 100 may be configured with the aforementioned processor 110 and relevant programs stored in the program storage area 131. In other words, each of the above elements 600, 610, 620, 630, 640, and 650 may be achieved by the processor 110 executing relevant programs stored in the program storage area 131.

The cumulative consumption amount obtainer 600 is configured to obtain the cumulative consumption amount of the consumable material used for image formation by the inkjet head 3 from the aforementioned service information storage area 123. As described above, the printer 200 periodically sends the latest cumulative consumption amount of the consumable material to the information management server 100 at the particular cycle. In response to the periodic transmission from the printer 200, the cumulative consumption amount obtainer 600 obtains the cumulative consumption amount of the consumable material at the same particular cycle (e.g., at intervals of several minutes).

The bottle capacity obtainer 610 is configured to obtain the aforementioned 100% volume (i.e., 100% of the fixed volume) corresponding to the capacity of the bottle that has been previously stored in the service information storage area 123. The correction value obtainer 620 is configured to obtain the consumption error coefficient that has been previously stored in the service information storage area 123.

The number-of-bottle-ordering-times obtainer 630 is configured to obtain the number of bottle ordering times in the past that has been previously stored in the service information storage area 123. For instance, the number-of-bottle-ordering-times obtainer 630 may obtain the number of bottle ordering times, when the delivery of the most recently ordered bottle to the delivery destination (i.e., the user's location) has been either completed or definitely arranged. In this case, delivery status information about whether the delivery of the most recently ordered bottle to the delivery destination has been completed or not, or definitely arranged or not may be sent by the delivery management server 400 to the information management server 100 based on a report from a shipping manager or delivery management information in the delivery management server 400. Based on the delivery status information obtained by the information management server 100, the number-of-bottle-ordering-times obtainer 630 may obtain the number of bottle ordering times. In another instance, after the delivery of the most recently ordered bottle, a notification that ink supply from the bottle into the tank 32 has been completed may be sent from the information terminal 300 to the information management server 100 in response to the information terminal 300 being operated as appropriate by the user. In this case, the number-of-bottle-ordering-times obtainer 630 may obtain the number of bottle ordering times in response to receipt of the notification.

The estimated remaining amount calculator 640 is configured to calculate a first integrated value by multiplying the cumulative consumption index, which corresponds to the cumulative consumption amount of the consumable material as obtained by the cumulative consumption amount obtainer 600, by the consumption error coefficient obtained by the correction value obtainer 620. The estimated remaining amount calculator 640 is further configured to calculate a second integrated value by multiplying the cumulative consumption index, which corresponds to the above 100% volume obtained by the bottle capacity obtainer 610, by the number of bottle ordering times obtained by the number-of-bottle-ordering-times obtainer 630. The estimated remaining amount calculator 640 is further configured to calculate the estimated remaining amount of ink in the tank 32 based on a subtraction value obtained by subtracting the first integrated value from the second integrated value. Specifically, the estimated remaining amount calculator 640 calculates the estimated remaining amount for each color of ink in the corresponding tank 32 according to the following formula (1).

Estimated Remaining Amount=(Second Integrated Value−First Integrated Value)/Cumulative Consumption Index for 100% Volume, where:

First Integrated Value=Cumulative Consumption Index for Cumulative Consumption Amount of Consumable Material×Consumption Error Coefficient, and Second Integrated Value=Cumulative Consumption Index for 100% Volume×Number of Bottle Ordering Times     Formula (1)

The determiner 650 is configured to determine whether to order a new bottle based on the cumulative consumption amount of the consumable material obtained by the cumulative consumption amount obtainer 600, the aforementioned 100% volume obtained by the bottle capacity obtainer 610, the number of bottle ordering times obtained by the number-of-bottle-ordering-times obtainer 630, and the consumption error coefficient obtained by the correction value obtainer 620. In this example, specifically, the determiner 650 determines whether to order a new bottle based on whether the estimated remaining amount calculated by the estimated remaining amount calculator 640 reaches a predetermined threshold. In the illustrative embodiment, an explanation will be provided of an example case in which 20% volume is employed as the predetermined threshold in the same manner as in the aforementioned example. However, the predetermined threshold is not limited to 20% volume, but other values may be employed.

Figure 6:
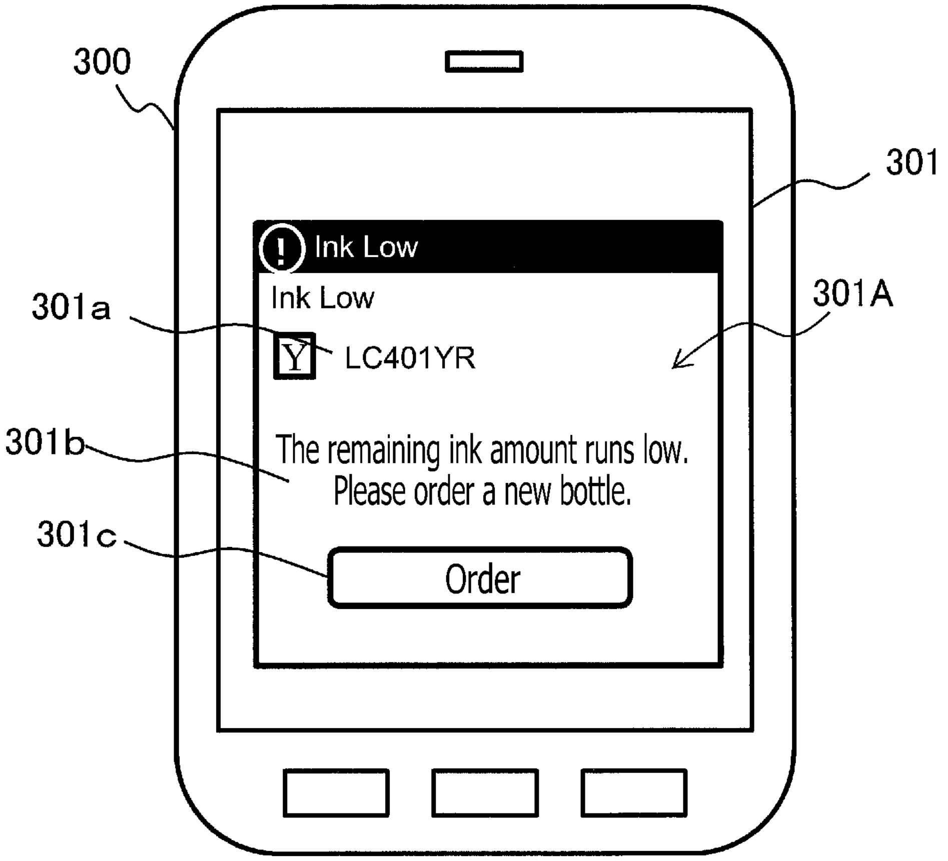
FIG. 6 shows an example of a display screen on a mobile terminal.

When the determiner 650 determines to order a new bottle, a corresponding instruction signal is sent to the information terminal 300. In response to receipt of the instruction signal, the information terminal 300 displays a corresponding warning notification on the display 301. FIG. 6 shows an example of the warning notification displayed on the display 301 of the information terminal 300. As shown in FIG. 6, a warning screen 301A displayed on the display 301 includes an ink display section 301*a*, a message display section 301*b*, and an "Order" button 301*c*. The ink display section 301*a* is configured to display a color of ink of which the estimated remaining amount has reached the above predetermined threshold. The message display section 301*b* is configured to display a message such as "The remaining ink amount runs low. Please order a new bottle." The "Order" button 301*c* is configured to, when operated, cause the information terminal 300 to send a corresponding ordering instruction signal to the delivery management server 400, thereby placing an order for a new bottle.

Control Procedure

Figure 7:
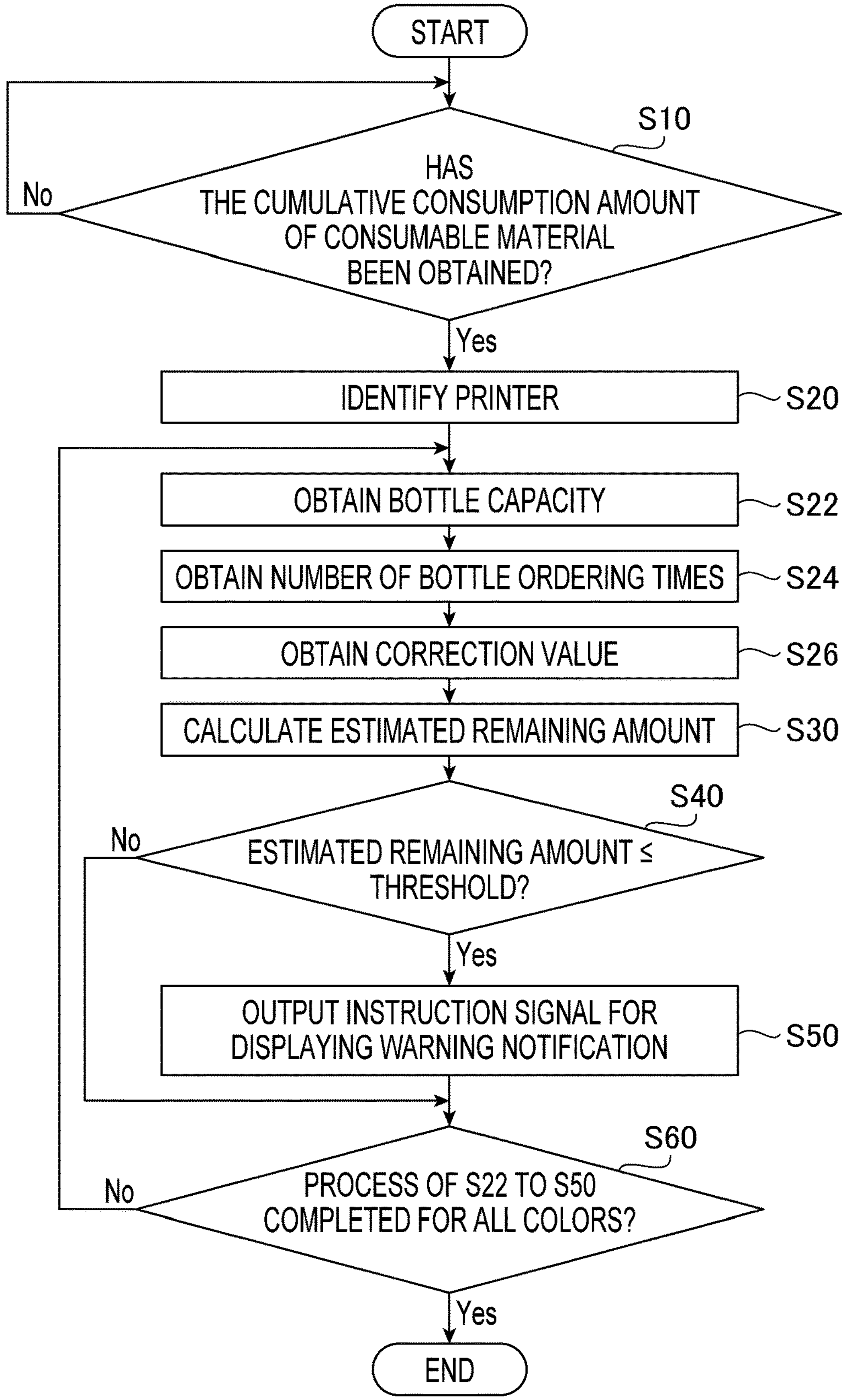
FIG. 7 is a flowchart showing a control procedure to be executed by a processor of an information management server.

An explanation will be provided of a control procedure to be performed by the processor 110 (more specifically, by the processor 110 executing relevant programs) of the information management server 100 to implement the aforementioned method with reference to FIG. 7.

As shown in FIG. 7, the processor 110 first determines in S10 whether the latest cumulative consumption amount of the consumable material has been obtained by the cumulative consumption amount obtainer 600 in response to the periodic transmission from the printer 200. When determining that the latest cumulative consumption amount of the consumable material has been obtained by the cumulative consumption amount obtainer 600 (S10: Yes), the processor 110 proceeds to S20. In S20, the processor 110 identifies an individual (i.e., the printer 200) associated with the obtained cumulative consumption amount of the consumable material based on what is stored in the device number storage area 122.

In S22, the bottle capacity obtainer 610 obtains the capacity (i.e., the aforementioned 100% volume) of a bottle for a target one of the four ink colors. In S24, the number-bottle-ordering-times obtainer 630 obtains the number of bottle ordering times (i.e., the number of times that the bottle has been ordered in the past) for the target color. In S26, the correction value obtainer 620 obtains the consumption error coefficient which it has been previously determined to use in calculating the estimated remaining amount for the target color. In S30, the estimated remaining amount calculator 640 calculates the estimated remaining amount for the target color using the aforementioned formula (1), based on the cumulative consumption amount of the consumable material as obtained in S10, the consumption error coefficient obtained in S26, the aforementioned 100% volume obtained in S22, and the number of bottle ordering times obtained in S24.

In S40, the determiner 650 determines whether the estimated remaining amount calculated in S30 is equal to or less than the predetermined threshold (e.g., 20% volume). When determining that the estimated remaining amount is more than the predetermined threshold (S40: No), the processor 110 proceeds to S60. When determining that the estimated remaining amount is equal to or less than the predetermined threshold (S40: Yes), the processor 110 proceeds to S50. In S50, the determiner 650 sends an instruction signal for causing the display 301 to display the aforementioned warning notification to the information terminal 300 of the user of the printer 200 identified in S20. In S60, the processor 110 determines whether the process of S22 to S50 has been completed for all of the four colors. When determining that the process of S22 to S50 has been completed for not all of the four colors (i.e., for three or less colors) (S60: No), the processor 110 goes back to S22, and performs the same process of S22 to S50 for another target one of the four colors. When determining that the process of S22 to S50 has been completed for all of the four colors (S60: Yes), the processor 110 terminates this flow, i.e., the control procedure shown in FIG. 7.

As described above, the above control procedure, more specifically, the determination made by the determiner 650 in S40 is performed each time the cumulative consumption amount obtainer 600 obtains the cumulative consumption amount of the consumable material periodically at the particular cycle. However, the timing to make the determination in S40 is not limited to the above timing. For instance, the control procedure (more specifically, the determination in S40) may be performed upon receipt, from the delivery management server 400, of a notification that the delivery of the most recently ordered bottle to the delivery destination has been definitely arranged. In the case where the control procedure is performed when the delivery of the most recently ordered bottle(s) has been definitely arranged, the above notification from the delivery management server 400 may include a printer number and color type information of the bottle(s) to be delivered. In this case, in S20 of FIG. 7, the target printer 200 may be identified by the printer number included in the notification from the delivery management server 400. Further, the process of S22 to S50 may be performed for each of one or more ink colors corresponding to the color type information included in the notification from the delivery management server 400. In particular, in S24, the number of bottle ordering times, after counted up by one in response to the delivery of the most recently ordered bottle(s) being definitely arranged, may be obtained for a target one of the one or more ink colors corresponding to the color type information included in the notification.

Operations and Advantageous Effects of Illustrative Embodiment

In the illustrative embodiment, as described above, the estimated remaining amount is calculated based on the cumulative consumption amount of the consumable material as obtained by the cumulative consumption amount obtainer 600, the aforementioned 100% volume obtained by the bottle capacity obtainer 610, the number of bottle ordering times obtained by the number-of-bottle-ordering-times obtainer 630, and the consumption error coefficient obtained by the correction value obtainer 620. Thereby, it is possible to estimate the remaining amount of ink in each tank 32 in such a manner as to accommodate the aforementioned variation among individual printers 200 and prevent running out of ink. A specific explanation will be provided of the operations and advantageous effects of the illustrative embodiment with reference to a comparative example.

Comparative Example

As a comparative example of the illustrative embodiment, FIGS. 8A and 8B show an example of a transition of the estimated remaining amount when the estimated remaining amount is calculated without using the consumption error coefficient, in other words, under an assumption that the consumption error is 0. In the comparative example shown in FIGS. 8A and 8B, the cumulative consumption index is expressed in substantially the same manner as in FIGS. 3B and 4B, i.e., in such a manner that the value equivalent to 100% volume is indexed as 5, and the value equivalent to 20% volume is indexed as 1. Further, the estimated remaining amount is expressed with the aforementioned fixed volume as 100%.

As shown in FIGS. 8A and 8B, as described above, when the cumulative consumption index makes a transition from 0 to 1, 2, 3, . . . , the estimated remaining amount calculated without using the consumption error coefficient makes a transition from 100% volume to 80% volume, 60% volume, 10% volume, . . . and so on. When the cumulative consumption index becomes 4, and the estimated remaining amount becomes 20%, a new bottle is ordered. When a new bottle arrives at the user's location, and 100% volume is additionally fed into the tank 32, the number of bottle ordering times becomes 1, whereas the cumulative consumption index remains at 4. Further, the estimated remaining amount becomes 120% volume with 100% volume added from the new bottle (see values in a corresponding bold frame in FIG. 8A). Thereafter, in substantially the same manner as above, the cumulative consumption index makes a transition to 4, 5, 6, . . . , and the estimated remaining amount makes a transition to 120% volume, 100% volume, 80% volume, . . . and so on. Then, when the cumulative consumption index becomes 9, and the estimated remaining amount becomes 20% volume, a new bottle is ordered. When a new bottle arrives at the user's location, and 100% volume is additionally fed into the tank 32, the number of bottle ordering times becomes 2, whereas the cumulative consumption index remains at 9. Further, the estimated remaining amount becomes 120% volume with 100% volume added from the new bottle (see values in a corresponding bold frame in FIG. 8A). Thereafter, similarly, a new bottle is ordered in each of the cases where the cumulative consumption index becomes 14, 19, 24, . . . , in which the estimated remaining amount is 20% volume. In these cases, the number of bottle ordering times becomes 3, 4, 5, . . . , respectively. Further, in each of these cases, the estimated remaining amount becomes 120% volume with 100% volume added from each new bottle (see values in each bold frame).

In the method of the comparative example, the estimated remaining amount is calculated with the consumption error assumed as 0, and a new bottle is ordered each time the remaining amount of ink in the tank 32 is estimated to have dropped to 20% volume or less. Then, each time a new bottle arrives at the user's location, ink is additionally supplied from the new bottle into the tank 32. In this case, if an actual consumption error of the printer 200 is ±0%, as shown by a solid line in FIG. 9, no matter what value the cumulative consumption index increases to after the start of the user's usage of the printer 200, the estimated remaining amount will never become 0% volume. If the actual consumption error of the printer 200 is −5%, as the cumulative consumption index increases, a line chart behavior of the estimated remaining amount shown by a dashed line in FIG. 9 will become gradually farther upward from the line chart behavior thereof shown by the solid line in FIG. 9 in the case where the actual consumption error of the printer 200 is ±0%. As a result, the estimated remaining amount will never become 0% volume.

However, if the actual consumption error of the printer 200 is +5%, as the cumulative consumption index increases, a line chart behavior of the estimated remaining amount shown by an alternate long and short dash line in FIG. 9 will become gradually farther downward from the line chart behavior thereof shown by the solid line in FIG. 9 in the case where the actual consumption error of the printer 200 is ±0%. As a result, as shown in FIGS. 8A, 8B, and 9, for instance, when the cumulative consumption index is 24, 29, or 30, the estimated remaining amount will become a negative value less than 0% volume. Namely, in this case, the ink in the tank 32 may run out before a next new bottle arrives at the user's location.

Illustrative Embodiment

In the method of the illustrative embodiment using the aforementioned consumption error coefficient, FIGS. 10A and 10B show an example of the transition of the estimated remaining amount calculated using a consumption error coefficient of 1.05 with a consumption error of +5% assumed for the sake of safety. In FIGS. 10A and 10B, unlike the previous example, in this example, the cumulative consumption index is expressed in such a manner that the value equivalent to 100% volume is indexed as 10, and a value equivalent to 10% volume is indexed as 1. The estimated remaining amount is expressed as a value with the fixed volume as 100% in the same manner as in the previous example.

As shown in FIGS. 10A and 10B, when the cumulative consumption index makes a transition from 0 to 1, 2, 3, . . . , the estimated remaining amount calculated using a consumption error coefficient of 1.5 makes a transition from 100% volume to 90% volume, 79% volume, 69% volume, . . . and so on. When the cumulative consumption index becomes 8, and the estimated remaining amount becomes 16% volume that is less than 20% volume, a new bottle is ordered. Then, when a new bottle arrives at the user's location, and 100% volume is additionally fed into the tank 32, the number of bottle ordering times becomes 1, whereas the cumulative consumption index remains at 8. Further, the estimated remaining amount becomes 116% volume with 100% volume added from the new bottle (see values in a corresponding bold frame in FIG. 10A). Thereafter, in substantially the same manner as described above, the cumulative consumption index makes a transition to 8, 9, 10, . . . , and the estimated remaining amount makes a transition to 116% volume, 106% volume, 95% volume, . . . and so on. When the cumulative consumption index becomes 18, and the estimated remaining amount becomes 11% volume, a new bottle is ordered. Then, when a new bottle arrives at the user's location, and 100% volume is additionally fed into the tank 32, the number of bottle ordering times is set to 2, whereas the cumulative consumption index remains at 18. Further, the estimated remaining amount becomes 111% volume with 100% volume added from the new bottle (see values in a corresponding bold frame in FIG. 10A). Thereafter, similarly, a new bottle is ordered in each of the cases where the cumulative consumption index becomes 27, 37, 46, . . . , in which the estimated remaining amount is equal to or less than 20% volume. In these cases, the number of bottle ordering times is set to 3, 4, 5, . . . , respectively. Further, in these cases, the estimated remaining amount becomes 117% volume, 112% volume, 117% volume, . . . , respectively, with 100% volume added from each new bottle (see values in each bold frame).

In this method of the illustrative embodiment, the estimated remaining amount is calculated with the consumption error assumed as +5%, and a new bottle is ordered each time the remaining amount of ink in the tank 32 is estimated to have dropped to 20% volume or less. Then, each time a new bottle arrives at the user's location, ink is additionally supplied from the new bottle into the tank 32. In this case, if the actual consumption error of the printer 200 is +5%, as shown by a solid line in FIG. 11, no matter what value the cumulative consumption index increases to after the start of the user's usage of the printer 200, the estimated remaining amount will never become 0% volume. If the actual consumption error of the printer 200 is ±0%, as the cumulative consumption index increases, a line chart behavior of the estimated remaining amount shown by an alternate long and short dash line in FIG. 11 will become gradually farther upward from the line chart behavior thereof shown by the solid line in FIG. 11 in the case where the actual consumption error of the printer 200 is +5%. As a result, the estimated remaining amount will never become 0% volume. Further, if the actual consumption error of the printer 200 is −5%, as the cumulative consumption index increases, a line chart behavior of the estimated remaining amount shown by a dashed line in FIG. 11 will become gradually farther upward from the line chart behavior thereof shown by the alternate long and short dash line in FIG. 11 in the case where the actual consumption error of the printer 200 is ±0%. As a result, the estimated remaining amount will never become 0% volume. On the other hand, at an attempt to refill the tank 32 with ink from a new bottle that has arrived at the user's location after ordering, not all of the ink from the new bottle may be fed into the tank 32. However, even in such a case, the ink remaining in the bottle may be used later to refill the tank 32.

Thus, in the illustrative embodiment, no matter what value the cumulative consumption index is, and no matter what value within a range of −5% to +5% the actual consumption error of the printer 200 is, the estimated remaining amount never becomes a negative value that is less than 0% volume. Namely, in this case, the ink in tank 32 does not run out before a next new bottle arrives at the user's location. In other words, it is possible to certainly deliver the next new bottle to the user before the ink in the tank 32 runs out.

Advantageous Effects of Illustrative Embodiment

As described above, in the illustrative embodiment, ink to be used for printing with the inkjet head 3 is stored in each tank 32. Each tank 32 is supplied with ink from a corresponding bottle. Each bottle has a predetermined capacity equivalent to the aforementioned 100% volume (i.e., 100% of the fixed volume), and is configured to supply ink therefrom into the corresponding tank 32. In supplying ink from a bottle to a corresponding tank 32, ink of the aforementioned 100% volume may be supplied from the bottle filled with the ink into the tank 32 in a single operation or a plurality of separated operations. An individual bottle is ordered each time it is needed, and is delivered to the user of the printer 200. The remaining amount of ink in the tank 32 decreases gradually as ink is consumed by printing. However, in the illustrative embodiment, the actual remaining amount of ink in the tank 32 is not measurable. Therefore, in order to estimate the unmeasurable remaining amount of ink in the tank 32, the print processing system 1 (more specifically, the information management server 100) includes the cumulative consumption amount obtainer 600, the bottle capacity obtainer 610, and the number-of-bottle-ordering-times obtainer 630.

The cumulative consumption amount obtainer 600 is configured to obtain the cumulative consumption amount of the consumable material consumed through printing with the inkjet head 3. The bottle capacity obtainer 610 is configured to obtain the aforementioned 100% volume of the bottle. The number-of-bottle-ordering-times obtainer 630 is configured to obtain the number of times the bottle has been ordered in the past. In the illustrative embodiment, the consumption error coefficient is used to correct for an individual difference pertaining to ink consumption characteristics in the inkjet head 3 of each individual printer 200. The consumption error coefficient is obtained by the correction value obtainer 620. In the illustrative embodiment, the determiner 650 is configured to determine whether to place an order for a new bottle. More specifically, the determiner 650 determines whether to order a new bottle based on the consumption error coefficient obtained by the correction value obtainer 620, as well as the cumulative consumption amount of the consumable material as obtained by the cumulative consumption amount obtainer 600, the aforementioned 100% volume obtained by the bottle capacity obtainer 610, and the number of bottle ordering times obtained by the number-of-bottle-ordering-times obtainer 630.

In the illustrative embodiment, the remaining amount of ink in each tank 32 is estimated using the consumption error coefficient for correcting for the individual variation in the rate of increase in the amount of ink consumed with an increase in the number of printed sheets, which varies from one printer to another among the individual printers 200 depending on the ink consumption characteristics in the individual inkjet heads 3. Thereby, it is possible to estimate the remaining amount of ink in the tank 32 in such a manner as not to cause the ink to run out. According to the illustrative embodiment, it is possible to determine when to order a new bottle in such a manner as not to cause the ink to run out, based on the estimated remaining amount of ink in the tank 32. Therefore, it is possible to certainly deliver a next new bottle to the user before the ink in the tank 32 runs out.

Further, in the illustrative embodiment, in particular, when the determiner 650 determines to order a new bottle, a corresponding display is shown on the display 301 of the information terminal 300. According to the illustrative embodiment, the user who sees the corresponding display shown on the display 301 may operate the "Order" button 301*c* at appropriate timing to place an order for a new bottle, thereby certainly obtaining the next bottle before the ink runs out.

Further, in the illustrative embodiment, the number-of-bottle-ordering-times obtainer 630 obtains the number of bottle ordering times, in particular, at one of the times when the delivery of the bottle is definitely arranged, when the delivery of the bottle is completed, and when the supply of ink using the bottle is completed. According to the illustrative embodiment, the number of bottle ordering times is certainly obtained at appropriate timing. Thereby, it is possible to accurately estimate the remaining amount of ink in the tank 32.

In the illustrative embodiment, the determiner 650 determines whether to order a new bottle, in particular, when the cumulative consumption amount of the consumable material is obtained periodically at the particular cycle, or when the delivery of the bottle is definitely arranged. According to the illustrative embodiment, whether to order a new bottle is determined at appropriate timing. Thereby, it is possible to determine with high accuracy when to order a new bottle.

Further, in the illustrative embodiment, in particular, the estimated remaining amount calculator 640 calculates the estimated remaining amount of ink to be used for the determiner 650 to determine whether to order a new bottle. The estimated remaining amount calculator 640 calculates the first integrated value by multiplying the cumulative consumption index, which corresponds to the cumulative consumption amount of the consumable material as obtained by the cumulative consumption amount obtainer 600, by the consumption error coefficient. The estimated remaining amount calculator 640 calculates the second integrated value by multiplying the cumulative consumption index, which corresponds to the above 100% volume obtained by the bottle capacity obtainer 610, by the number of bottle ordering times obtained by the number-of-bottle-ordering-times obtainer 630. The estimated remaining amount calculator 640 is enabled to obtain a subtraction value by subtracting the first integrated value from the second integrated value, and calculate the estimated remaining amount based on the obtained subtraction value. The determiner 650 determines whether to order a new bottle based on whether the calculated estimated remaining amount has reached the predetermined threshold. According to the illustrative embodiment, the determiner 650 is enabled to accurately determine when to order a new bottle based on the estimated remaining amount of ink calculated by the estimated remaining amount calculator 640.

While aspects of the present disclosure have been described in conjunction with various example structures outlined above and illustrated in the drawings, various alternatives, modifications, variations, improvements, and/or substantial equivalents, whether known or that may be presently unforeseen, may become apparent to those having at least ordinary skill in the art. Accordingly, the example embodiment(s), as set forth above, are intended to be illustrative of the technical concepts according to aspects of the present disclosure, and not limiting the technical concepts. Various changes may be made without departing from the spirit and scope of the technical concepts according to aspects of the present disclosure. Therefore, the disclosure is intended to embrace all known or later developed alternatives, modifications, variations, improvements, and/or substantial equivalents. Some specific examples of potential alternatives, modifications, or variations according to aspects of the disclosure are provided below.

Modifications

(1) First Modification to Compensate for Ink Spilled During Ink Supply

There may be a case where a part of ink in a bottle is unable to be supplied into the tank 32 since an ink supply failure such as ink spillage occurs due to a user's manual operation error when attempting to supply the ink from the bottle into the tank 32. In this case, an amount of ink that has been actually supplied into the tank 32 is less than an amount of ink that was originally supposed to be supplied into the tank 32. Therefore, the actual amount of ink in the tank 32 will reach the predetermined threshold at an earlier timing than originally assumed.

FIG. 12A shows an example case in which ink of 60% volume was spilled in an attempt to supply ink from the bottle into the tank 32, and only 40% volume has been actually supplied into the tank 32. In the example shown in FIG. 12A, the cumulative consumption index is expressed in substantially the same manner as described above, i.e., in such a manner that the value equivalent to 100% volume is indexed as 5, and the value equivalent to 20% volume is indexed as 1. In FIG. 12A, even when only 40% volume has been supplied from the bottle into the tank 32 at the beginning as described above, the cumulative consumption index is 0, and the number of bottle ordering times at this point of time is 0. Therefore, the estimated remaining amount calculated by the formula (1) is 100% volume. Nonetheless, the amount of ink that has been actually supplied into the tank 32 is 40% volume. Hence, the actual remaining amount (hereinafter, which may be referred to as a "physical remaining amount") of ink in the tank 32 at this point of time is 40% volume.

The physical remaining amount gradually decreases as the number of printed pages increases with user usage, and for instance, when ink equivalent to 20% volume is consumed from the ink stored in the tank 32, the cumulative consumption index becomes 1, the estimated remaining amount becomes 80% volume, and the physical remaining amount becomes 20% volume. Further, when ink equivalent to 40% volume is consumed from the ink left in the tank 32 is consumed as the number of printed pages increases, the cumulative consumption index becomes 2, the estimated remaining amount becomes 60% volume, and the physical remaining amount becomes 0% volume. Namely, at this point of time, the printer 200 is unable to perform printing since the actual remaining amount of ink in the tank 32 is zero. However, as described above, the estimated remaining amount is calculated by the estimated remaining amount calculator 640 under the assumption that the aforementioned 100% volume has been all supplied into the tank 32 without the ink supply failure. Namely, the estimated remaining amount, based on the above assumption, does not reach the predetermined threshold (e.g., 20% volume) at this timing. As a result, a new order for a next bottle is unable to be placed.

In a first modification according to aspects of the present disclosure, in view of the above problem, the information management server 100 is configured to correct the estimated remaining amount, thereby making it possible to place a new order for a next bottle at appropriate timing. FIG. 13 shows a software block configuration in the first modification. FIG. 13 corresponds to FIG. 5 showing the software block configuration in the aforementioned illustrative embodiment. As shown in FIG. 13, the information management server 100 includes a remaining amount corrector 660. For instance, the remaining amount corrector 660 may be configured with the aforementioned processor 110 and relevant programs stored in the program storage area 131. In other words, the remaining amount corrector 660 may be achieved by the processor 110 executing relevant programs stored in the program storage area 131.

When the user fails to feed the ink from the bottle into the tank 32 as described above, the user checks, for instance, visually, how much ink has been supplied into the tank 32 at the present time. Then, the user contacts a particular department (e.g., a call center) of the manufacturer of the printer 200 to convey the result of the user's visual checking and a request to place an additional order for a new bottle. For instance, in the above example, in response to ink of 60% volume having been spilled and ink of 40% volume having been fed into the tank 32, the user informs the call center that the physical remaining amount of ink in the tank 32 immediately after the ink has been supplied into the tank 32 is 40% volume.

The remaining amount corrector 660 of the information management server 100 corrects the estimated remaining amount calculated by the estimated remaining amount calculator 640, when the user has made a request to order a new bottle in a state where the determiner 650 determines not to order a new bottle since the estimated remaining amount has not fallen to the predetermined threshold due to the aforementioned ink supply failure. Specifically, in the above example, the remaining amount corrector 660 sets the estimated remaining amount back to 100% volume to compensate for the spilled ink of 60% volume. When ink has been fed into the tank 32 by the user after the arrival of the ordered bottle, the physical remaining amount becomes 100% volume. Consequently, at this point of time, the aforementioned state where the cumulative consumption index is 2, the number of bottle ordering times is 0, the estimated remaining amount is 60% volume, and the physical remaining amount is 0% volume makes a transition to a state where the cumulative consumption index is 2, the number of bottle ordering times is 1, the estimated remaining amount is 100% volume, and the physical remaining amount is 100% volume (see values in a bold frame in FIG. 12A). It is noted that in this example, the cumulative consumption index for compensation is "3" corresponding to the aforementioned 60% volume. Since the transition of each value after this in FIG. 12A is made in substantially the same manner as already described, an explanation thereof will be omitted.

As a result of the above process performed by the remaining amount corrector 660, the estimated remaining amount finally calculated by the estimated remaining amount calculator 640 and the remaining amount corrector 660 is expressed by the following formula (2), which corresponds to the aforementioned formula (1).

Estimated Remaining Amount=(Second Integrated Value−First Integrated Value+Cumulative Consumption Index for Compensation)/Cumulative Consumption Index for 100% Volume, where:

First Integrated Value=Cumulative Consumption Index for Cumulative Consumption Amount of Consumable Material×Consumption Error Coefficient, and Second Integrated Value=Cumulative Consumption Index for 100% Volume×Number of Bottle Ordering Times Formula (2)

FIG. 14 shows a control procedure to be executed by the remaining amount corrector 660 to implement the aforementioned method. As shown in FIG. 14, the remaining amount corrector 660 first determines in S110 whether a notification that an order for a new bottle has been placed by the user has been received from the call center. When determining that a notification that an order for a new bottle has been placed by the user has been received from the call center (S110: Yes), the remaining amount corrector 660 proceeds to S120.

In S120, the remaining amount corrector 660 identifies a target individual (i.e., the printer 200) based on the printer number of the printer 200 sent with the notification from the call center. In S130, the remaining amount corrector 660 corrects the estimated remaining amount calculated as described above by the estimated remaining amount calculator 640 with respect to the printer 200 identified in S120, in such a manner as to compensate for the amount of spilled ink. Thereafter, the remaining amount corrector 660 terminates the control procedure shown in FIG. 14. The corrected estimated remaining amount is input into the determiner 650. The determiner 650 determines whether to order a new bottle based on comparison of the corrected estimated remaining amount with the predetermined threshold.

In the first modification, the control procedure shown in FIG. 7, more specifically, the determination by the determiner 650 in S40 may be performed, for instance, at a particular timing based on a request from the user of the printer 200 (e.g., when the information management server 100 has received the notification from the call center that received the aforementioned user's request to order a new bottle).

FIG. 12B shows an example of an actual transition of the estimated remaining amount in the first modification. As shown in FIG. 12B, as the cumulative consumption index makes a transition from 0 to 1, 2, . . . as described above, the standard value of the estimated remaining amount in the case of no consumption error makes a transition from 100% volume to 80% volume, 60% volume, . . . and so on. Assuming the printer 200 as an individual having a consumption error of −5%, the estimated remaining amount makes a transition from 100% volume to 81% volume, 62% volume, . . . and so on. Assuming the printer 200 as an individual having a consumption error of +5%, the estimated remaining amount makes a transition from 100% volume to 79% volume, 58% volume, . . . and so on.

In the case where only 40% volume has been fed into the tank 32 at the beginning as in the aforementioned example, the physical remaining amount is 0% volume when the cumulative consumption index is 2. In this case, the standard value of the estimated remaining amount is 60% volume as described above. Further, in this case, the estimated remaining amount with a consumption error of −5% is 62% volume. Moreover, in this case, the estimated remaining amount with a consumption error of +5% is 58% volume. In substantially the same manner as described above, when the estimated remaining amount is set back to 100% volume to compensate for the shortfall, the number of bottle ordering times becomes 1, whereas the cumulative consumption index remains at 2. In this case, the standard value of the estimated remaining amount becomes 100% volume. Further, in this case, the estimated remaining amount with a consumption error of −5% also becomes 100% volume. Moreover, in this case, the estimated remaining amount with a consumption error of +5% also becomes 100% volume (see values in each bold frame). At this time, the standard value of the cumulative consumption index for compensation is 3 corresponding to the aforementioned 60% volume. Further, the cumulative consumption index for compensation with a consumption error of −5% is 3.1 corresponding to the aforementioned 62% volume. Moreover, the cumulative consumption index for compensation with a consumption error of +5% is 2.9 corresponding to the aforementioned 58% volume. Since the transition of each value after this in FIG. 12B is made in substantially the same manner as already described, an explanation thereof will be omitted.

As described above, in the first modification, the remaining amount corrector 660 may correct the estimated remaining amount calculated by the estimated remaining amount calculator 640 when an order for a new bottle is placed based on a user's request in a state where the determiner 650 determines not to order a new bottle due to the aforementioned ink supply failure. Thus, according to the first modification, it is possible to eliminate the problem regarding an excessive value of the estimated remaining amount due to the ink supply failure and calculate a correct value of the estimated remaining amount. Further, in the first modification, in particular, the determiner 650 may determine whether to order a new bottle at the particular timing based on the user's request. Thereby, it is possible to accurately determine when to order a new bottle by determining whether to order a new bottle at the appropriate timing.

(2) Second Modification to Replace the Estimated Remaining Amount with a User-Specified Indication Value In managing the remaining amount of ink through calculating the estimated remaining amount in the method of the aforementioned illustrative embodiment, there may be a case in which the user obtains, e.g., through visually checking, an accurate value of the actual remaining amount of ink in the tank 32. In a second modification according to aspects of the present disclosure, in such a case, the estimated remaining amount may be replaced with a user-specified indication value (i.e., a value of the remaining ink amount specified by the user, e.g., through visually checking).

FIG. 15, which corresponds to FIG. 5, shows a software block configuration in the second modification. As shown in FIG. 15, the information management server 100 includes an indication value obtainer 670 and a remaining amount replacer 680. For instance, each of the indication value obtainer 670 and the remaining amount replacer 680 may be configured with the aforementioned processor 110 and relevant programs stored in relevant programs stored in the program storage area 131. In other words, each of the indication value obtainer 670 and the remaining amount replacer 680 may be achieved by the processor 110 executing relevant programs stored in the program storage area 131. The indication value obtainer 670 is configured to obtain an indication value input by the user via the information terminal 300. The indication value is a value of the remaining amount of ink as obtained by the user, for instance, through visually checking. The remaining amount replacer 680 is configured to replace the estimated remaining amount calculated by the estimated remaining amount calculator 640 with the indication value obtained by the indication value obtainer 670.

FIGS. 16, 16B, and 17 show an example of the transition of the estimated remaining amount actually realized by the above configuration. In this example, the cumulative consumption index is expressed in such a manner that a value equivalent to the aforementioned 100% volume is indexed as 5, and a value equivalent to 20% volume is indexed as 1. Moreover, in this example, since the estimated remaining amount is replaced with the aforementioned indication value, it is guaranteed to some extent that the ink will not run out until the arrival of a new bottle. Hence, the estimated remaining amount is calculated with the consumption error as 0.

In FIGS. 16A, 16B, and 17, in substantially the same manner as described above, as the cumulative consumption index makes a transition from 0 to 1, 2, . . . , the estimated remaining amount with a consumption error of 0 makes a transition from 100% volume to 80% volume, 60% volume, . . . and so on. When the cumulative consumption index becomes 4, the estimated remaining amount becomes 20% volume, and a new bottle is ordered. After the arrival of the ordered new bottle, 100% volume is additionally fed into the tank 32 from the new bottle. Thereby, the number of bottle ordering times becomes 1, whereas the cumulative consumption index remains at 4. Further, the estimated remaining volume with a consumption error of 0 becomes 120% volume after 100% volume is added to 20% volume (see values in a corresponding bold frame in FIG. 16A). At this time, assuming the printer 200 as an individual having a consumption error of −5%, the estimated remaining amount becomes 124% volume. Further, assuming the printer 200 as an individual having a consumption error of +5%, the estimated remaining amount becomes 116% volume.

Afterward, when the cumulative consumption index further makes a transition to 5, 6, 7, . . . , the estimated remaining amount with a consumption error of 0 makes a transition to 100% volume, 80% volume, 60% volume, . . . and so on. When the cumulative consumption index becomes 9, the estimated remaining amount becomes 20% volume, and a new bottle is ordered. After the arrival of the ordered new bottle, 100% volume is additionally fed into the tank 32 from the new bottle. At this time, when the user visually recognizes that the actual remaining amount of ink in the tank 32 is equivalent to 20% volume, the information management server 100 receives from the information terminal 300 an indication value obtained through the user's visual recognition. Thereby, the number of bottle ordering times becomes 2, whereas the cumulative consumption index remains at 9. Moreover, the estimated remaining amount with a consumption error of 0 becomes 120% volume after 100% volume is added to 20% volume (see values in a corresponding bold frame in FIG. 16A). Correspondingly, a correction is made for the estimated remaining amount when the printer 200 is assumed as an individual having a consumption error of −5%, to be adjusted as well equal to 120% volume. Likewise, a correction is made for the estimated remaining amount when the printer 200 is assumed as an individual having a consumption error of +5%, to be adjusted as well equal to 120% volume. When the consumption error is −5%, an order for a next bottle is placed before the remaining amount of ink in the tank 32 becomes equivalent to 20% volume. In view of this, a next bottle may be ordered in response to the user visually recognizing that the actual remaining amount of ink in the tank 32 becomes equivalent to 20% volume after the order has been once stopped. The corrected cumulative consumption index is expressed as "9" corresponding to the cumulative consumption index at this time.

Then, in substantially the same manner as described above, as the cumulative consumption index further makes a transition to 10, 11, 12, . . . , the estimated remaining amount with a consumption error of 0 makes a transition to 100% volume, 80% volume, 60% volume, . . . and so on. When the cumulative consumption index becomes 14, the estimated remaining amount becomes 20% volume, and a new bottle is ordered. After the arrival of the ordered new bottle, 100% volume is additionally fed into the tank 32 from the new bottle. Thereby, the number of bottle ordering times becomes 3, whereas the cumulative consumption index remains at 14. The estimated remaining volume with a consumption error of 0 becomes 120% volume after 100% volume is added to 20% volume (see values in a corresponding bold frame in FIG. 16A). At this time, assuming the printer 200 as an individual having a consumption error of −5%, the estimated remaining amount becomes 125% volume. Further, assuming the printer 200 as an individual having a consumption error of +5%, the estimated remaining amount becomes 115% volume.

Afterward, when the cumulative consumption index further makes a transition to 15, 16, 17, . . . , the estimated remaining amount makes a transition to 100% volume, 80% volume, 60% volume, . . . and so on. When the cumulative consumption index becomes 19, the estimated remaining amount becomes 20% volume, and a new bottle is ordered. After the arrival of the ordered new bottle, 100% volume is additionally fed into the tank 32 from the new bottle. At this time, when the user visually recognizes again that the actual remaining amount of ink in the tank 32 is equivalent to 20% volume, the information management server 100 receives from the information terminal 300 an indication value obtained through the user's visual recognition. Thereby, the number of bottle ordering times becomes 4, whereas the cumulative consumption index remains at 19. Moreover, the estimated remaining amount with a consumption error of 0 becomes 120% volume after 100% volume is added to 20% volume (see values in a corresponding bold frame in FIG.

16A). Correspondingly, a correction is made for the estimated remaining amount when the printer 200 is assumed as an individual having a consumption error of −5%, to be adjusted as well equal to 120% volume. Likewise, a correction is made for the estimated remaining amount when the printer 200 is assumed as an individual having a consumption error of +5%, to be adjusted as well equal to 120% volume. The corrected cumulative consumption index is expressed as "19" corresponding to the cumulative consumption index at this time. Since the transition of each value after this in FIGS. 16A, 16B, and 17 is made in substantially the same manner as already described, an explanation thereof will be omitted.

In the second modification, the above processes are performed by the indication value obtainer 670 and the remaining amount replacer 680. As a result, the estimated remaining amount finally calculated by the estimated remaining amount calculator 640 is expressed by the following formula (3), which corresponds to the aforementioned formula (1).

Estimated Remaining Amount=(Second Integrated Value−First Integrated Value+Corrected Cumulative Consumption Index)/Cumulative Consumption Index for 100% Volume, where:

First Integrated Value=(Cumulative Consumption Index for Cumulative Consumption Amount of Consumable Material−Corrected Cumulative Consumption Index)×Consumption Error Coefficient, and Second Integrated Value=Cumulative Consumption Index for 100% Volume×Number of Bottle Ordering Times    Formula (3)

According to the second modification, the estimated remaining amount calculated by the estimated remaining amount calculator 640 is replaced with the indication value by the remaining amount replacer 680. Therefore, the determiner 650 is enabled to accurately determine when to order a new bottle based on the estimated remaining amount replaced with the indication value.

(3) Third Modification to Reset the Number of Bottle Ordering Times

In a third modification according to aspects of the present disclosure, when the estimated remaining amount is replaced with a remaining amount value obtained by the user, e.g., through visual checking as in the aforementioned second modification, the value of the number of bottle ordering times used in the calculation may be reset to 0 at an appropriate timing.

FIG. 18, which corresponds to FIG. 15, shows a software block configuration in the third modification. As shown in FIG. 18, the information management server 100 includes a number-of-bottle-ordering-times resetter 690 as well as the elements shown in FIG. 15. For instance, the number-of-bottle-ordering-times resetter 690 may be configured with the aforementioned processor 110 and relevant programs stored in the program storage area 131. In other words, the number-of-bottle-ordering-times resetter 690 may be achieved by the processor 110 executing relevant programs stored in the program storage area 131. In substantially the same manner as described above, when the remaining amount value (i.e., the indication value) obtained by the user, e.g., through visual checking is input via the information terminal 300, the indication value is obtained by the indication value obtainer 670. In the third modification, when the indication value is obtained by the indication value obtainer 670, the number-of-bottle-ordering-times resetter 690 may reset the obtained number of bottle ordering times.

FIGS. 19A, 19B, and 20 show an example of the transition of the estimated remaining amount as actually realized by the above configuration. In this example as well, the cumulative consumption index is expressed in such a manner that the value equivalent to 100% volume is indexed as 5, and the value equivalent to 20% volume is indexed as 1. Moreover, the estimated remaining amount is calculated with the consumption error as 0.

In FIGS. 19A, 19B, and 20, in substantially the same manner as described above, as the cumulative consumption index makes a transition from 0 to 1, 2, . . . , the estimated remaining amount with a consumption error of 0 makes a transition from 100% volume to 80% volume, 60% volume, . . . and so on. When the cumulative consumption index is 4, and the estimated remaining amount is 20%, 100% volume is additionally fed into the tank 32 from a new bottle. Thereby, the number of bottle ordering times becomes 1, whereas the cumulative consumption index remains at 4. Further, the estimated remaining amount with a consumption error of 0 changes from the aforementioned 20% volume to 120% volume (see values in a corresponding bold frame in FIG. 19A). Assuming the printer 200 as an individual having a consumption error of −5%, the estimated remaining amount becomes 124% volume. Assuming the printer 200 as an individual having a consumption error of +5%, the estimated remaining amount becomes 116% volume.

Afterward, when the cumulative consumption index further makes a transition to 5, 6, 7, . . . and then reaches 9, the estimated remaining amount becomes 20% volume, and a new bottle is ordered. After the arrival of the ordered new bottle, 100% volume is additionally fed into the tank 32 from the new bottle. At this time, in substantially the same manner as described above, when (the user recognizes that) the actual remaining amount of ink in the tank 32 is equivalent to 20% volume, the information management server 100 receives an indication value from the information terminal 300. In the third modification, at this time, the cumulative consumption index is maintained to be 9, and the number of bottle ordering times is reset to 0. Further, in this example, the estimated remaining amount with a consumption error of 0 is set to 119% volume after the addition of 100% volume (see values in a corresponding bold frame in FIG. 19A). Correspondingly, a correction is made for the estimated remaining amount when the printer 200 is assumed as an individual having a consumption error of −5%, to be adjusted as well equal to approximately 119% volume (more accurately, 118% volume as shown in FIG. 19A). Likewise, a correction is made for the estimated remaining amount when the printer 200 is assumed as an individual having a consumption error of +5%, to be adjusted as well equal to approximately 119% volume (more accurately, 120% volume as shown in FIG. 19A). The corrected cumulative consumption index is expressed as "9.95" corresponding to the cumulative consumption index at this time.

Thereafter, in substantially the same manner as described above, when the cumulative consumption index further makes a transition to 10, 11, 12, . . . and then reaches 14, the estimated remaining amount becomes less than 20% volume (more specifically, becomes 19% volume as shown in FIG. 19A), and a new bottle is ordered. After the arrival of the ordered new bottle, 100% volume is additionally fed into the tank 32 from the new bottle. Thereby, the number of bottle ordering times increases to 1, whereas the cumulative consumption index remains at 14. Further, the estimated remaining amount with a consumption error of 0 becomes 119% volume with 100% volume added to the aforementioned 19% volume (see values in a corresponding bold frame in FIG. 19A). Assuming the printer 200 as an individual having a consumption error of −5%, the estimated remaining amount becomes 123% volume. Assuming the printer 200 as an individual having a consumption error of +5%, the estimated remaining amount becomes 115% volume.

Thereafter, when the cumulative consumption index further makes a transition to 15, 16, 17, . . . and then reaches 19, the estimated remaining amount becomes less than 20% volume (more specifically, becomes 19% volume as shown in FIG. 19A), and a new bottle is ordered. After the arrival of the ordered new bottle, 100% volume is additionally fed into the tank 32 from the new bottle. Thereby, the number of bottle ordering times increases to 2, whereas the cumulative consumption index remains at 19. Further, at this time, the estimated remaining amount with a consumption error of 0 becomes 119% volume with 100% volume added to the aforementioned 19% volume (see values in a corresponding bold frame in FIG. 19A). Assuming the printer 200 as an individual having a consumption error of −5%, the estimated remaining amount becomes 128% volume. Assuming the printer 200 as an individual having a consumption error of +5%, the estimated remaining amount becomes 110% volume.

Thereafter, when the cumulative consumption index further makes a transition to 20, 21, 22, . . . and then reaches 24, the estimated remaining amount becomes less than 20% volume (more specifically, becomes 19% volume as shown in FIG. 19B), and a new bottle is ordered. After the arrival of the ordered new bottle, 100% volume is additionally fed into the tank 32 from the new bottle. At this time, when the user recognizes again that the actual remaining amount of ink in the tank 32 is equivalent to 20% volume, the information management server 100 receives an indication value from the information terminal 300. Further, at this time, the cumulative consumption index is maintained to be 24, and the number of bottle ordering times is reset to 0. Further, in this example, the estimated remaining amount with a consumption error of 0 is set to 118% volume after the addition of 100% volume (see values in a corresponding bold frame in FIG. 19B). Correspondingly, in substantially the same manner as described above, a correction is made for the estimated remaining amount when the printer 200 is assumed as an individual having a consumption error of −5%, to be adjusted as well equal to approximately 118% volume (more accurately, 117% volume as shown in FIG. 19B). Likewise, a correction is made for the estimated remaining amount when the printer 200 is assumed as an individual having a consumption error of +5%, to be adjusted as well equal to approximately 118% volume (more accurately, 119% volume as shown in FIG. 19B). The corrected cumulative consumption index is expressed as "24.9" corresponding to the cumulative consumption index at this time. Since the transition of each value after this in FIGS. 19A, 19B, and 20 is made in substantially the same manner as already described, an explanation thereof will be omitted.

In the third modification, as a result of the above processes performed by the indication value obtainer 670 and the remaining amount replacer 680, the estimated remaining amount finally calculated by the estimated remaining amount calculator 640 is expressed by the following formula (4), which corresponds to the aforementioned formula (3).

Estimated Remaining Amount=(Second Integrated Value−First Integrated Value)/Cumulative Consumption Index for 100% Volume, where:

First Integrated Value=(Cumulative Consumption Index for Cumulative Consumption Amount of Consumable Material−Corrected Cumulative Consumption Index)×Consumption Error Coefficient, and Second Integrated Value=Cumulative Consumption Index for 100% Volume×Number of Bottle Ordering Times     Formula (4)

According to the third modification, in addition to substantially the same effects as the aforementioned second modification, it is possible to reset influences of the consumption error back to those when the printer 200 has begun to be used by resetting the number of bottle ordering times. Therefore, the determiner 650 is enabled to further accurately determine when to order a new bottle.

(4) Forth Modification in Which the Printer has Functions of the Information Management Server In a fourth modification according to aspects of the present disclosure, in the print processing system 1 as shown in FIGS. 5, 13, 15, and 18, the printer 200 may have all the functions of the information management server 100. Namely, in the fourth modification, the printer 200 may include substantially the same elements as those shown, e.g., in FIG. 13, of the information management server 100. Specifically, the printer 200 may include a cumulative consumption amount obtainer, a bottle capacity obtainer, a correction value obtainer, a number-of-bottle-ordering-times obtainer, an estimated remaining amount calculator, and a determiner that are configured to serve in substantially the same manner as the cumulative consumption amount obtainer 600, the bottle capacity obtainer 610, the correction value obtainer 620, the number-of-bottle-ordering-times obtainer 630, the estimated remaining amount calculator 640, and the determiner 650, respectively. In this case, for instance, each of the above elements included in the printer 200 may be configured with the aforementioned CPU 51 and relevant programs stored in a non-transitory computer-readable medium such as the ROM 52 and the EEPROM 54. In other words, each of the above elements of the printer 200 may be achieved by the CPU 51 executing relevant programs stored in the non-transitory computer-readable medium.

In the fourth modification, the cumulative consumption amount obtainer of the printer 200 may obtain the cumulative consumption amount of the consumable material for image formation by the inkjet head 3, and the bottle capacity obtainer of the printer 200 may obtain the aforementioned 100% volume. Further, the number-of-bottle-ordering-times obtainer of the printer 200 may obtain the number of bottle ordering times in the past, and the correction value obtainer of the printer 200 may obtain the consumption error coefficient. Then, the determiner of the printer 200 may determine whether to order a new bottle, based on the cumulative consumption amount of the consumable material, the aforementioned 100% volume, the number of bottle ordering times, and the consumption error coefficient. According to the fourth modification, the printer 200 is enabled to estimate the remaining amount of ink in the tank 32 by using the consumption error coefficient in such a manner as not to cause running out of the ink, without relying on any servers such as the information management server 100. Thus, it is possible to order a new bottle at such a timing as not to cause running out of the ink, and certainly deliver a next bottle to the user before the ink runs out.

(5) Others

The above description has been provided with ink as an example of the printing consumable material. However, examples of the printing consumable material are not limited to ink. For instance, if the printer 200 is not an inkjet printer but a laser printer, toner may be an example of the printing consumable material.

In the above description, the direction of each arrow in FIGS. 5, 13, 15, and 18 shows an example of a signal flow direction but is not intended to limit the signal flow direction.

The flowcharts shown in FIGS. 7 and 14 are not intended to limit the technical concepts according to aspects of the present disclosure to the procedures indicated by the flowcharts, but may be modified by adding step(s), deleting step(s), and/or changing the order of the steps within the spirit and scope of the technical concepts according to aspects of the present disclosure.

With respect to the elements illustrated in the aforementioned illustrative embodiment and modifications, the shapes thereof, the numerical values therefor, and/or the structural and/or chronological interrelationship among a plurality of elements may be arbitrarily modified within the spirit and scope of the technical concepts according to aspects of the present disclosure.

Further, methods illustrated in the aforementioned illustrative embodiment and modifications may be used in combination as appropriate.

The problems to be solved by the technical concepts according to aspects of the present disclosure and the advantageous effects of the technical concepts are not limited to those described above. In other words, the technical concepts according to aspects of the present disclosure may solve a problem not described above or may produce an advantageous effect not described above, or may solve only some of the described problems or produce only some of the described advantageous effects.

Although other examples are not illustrated, the technical concepts according to aspects of the present disclosure may be practiced with various changes or modifications within the spirit and scope thereof.

The following shows examples of associations between elements illustrated in the aforementioned illustrative embodiment and modifications, and elements claimed according to aspects of the present disclosure. For instance, the print processing system 1 may be an example of a "system" according to aspects of the present disclosure. The printer 200 may be an example of a "printing apparatus" according to aspects of the present disclosure. The tanks 32 may be included in examples of a "tank" according to aspects of the present disclosure. The carriage 2 and the inkjet head 3 may be included in a "print engine" according to aspects of the present disclosure. The processor 110 may be an example of a "processor" of the "system" according to aspects of the present disclosure. The display 301 may be an example of a "display" according to aspects of the present disclosure. The non-volatile memory 130 may be an example of a "non-transitory computer-readable medium" of the "system" according to aspects of the present disclosure. The controller 50 may be an example of a "controller" of the "printing apparatus" according to aspects of the present disclosure. The CPU 51 may be an example of a "processor" of the "controller" according to aspects of the present disclosure. The ROM 52 and the EEPROM 54 may be included in examples of a "non-transitory computer-readable medium" of the "controller" according to aspects of the present disclosure.

What is claimed is:

1. A system comprising:

a tank configured to store therein a consumable material for printing supplied in units of a predetermined volume from a reservoir, without any detector to detect an actual remaining amount of the consumable material in the tank;

a print engine configured to perform image formation on a printing medium using the consumable material in the tank;

a cumulative consumption amount obtainer configured to obtain a cumulative consumption amount of the consumable material used for the image formation by the print engine;

a bottle capacity obtainer configured to obtain the predetermined volume corresponding to a capacity of the reservoir;

a number-of-bottle-ordering-times obtainer configured to obtain an order count representing how many times an order for the reservoir has been heretofore placed;

a correction value obtainer configured to obtain a consumption error correction value for correcting an individual difference in consumption characteristics for the print engine to consume the consumable material; and a determiner configured to determine whether to order a new reservoir, based on the cumulative consumption amount of the consumable material, the predetermined volume, the order count, and the consumption error correction value.

2. The system according to claim 1, further comprising a display configured to display relevant information when the determiner has determined to order a new reservoir.

3. The system according to claim 1, wherein the number-of-bottle-ordering-times obtainer is further configured to obtain the order count at a timing selected from a group consisting of:

a first timing at which delivery of a most recently ordered reservoir has been definitely arranged;

a second timing at which the delivery of the most recently ordered reservoir has been completed; and a third timing at which a notification has been received about completion of supplying the consumable material from the most recently ordered reservoir into the tank.

4. The system according to claim 1, wherein the determiner is configured to determine whether to order a new reservoir at one or more timings selected from a group consisting of:

a first timing at which the cumulative consumption amount of the consumable material is obtained periodically at a particular cycle;

a second timing at which delivery of a most recently ordered reservoir has been definitely arranged; and a third timing based on a user request.

5. The system according to claim 1, further comprising an estimated remaining amount calculator configured to calculate an estimated remaining amount of the consumable material in the tank, based on a value obtained by subtracting a second integrated value from a first integrated value, the first integrated value resulting from multiplying the cumulative consumption amount of the consumable material by a consumption error coefficient as the consumption error correction value, the second integrated value resulting from multiplying the predetermined volume by the order count, wherein the determiner is configured to determine whether to order a new reservoir, based on whether the estimated remaining amount of the consumable material has reached a threshold.

6. The system according to claim 5, further comprising a remaining amount corrector configured to correct the estimated remaining amount of the consumable material when a new reservoir has been ordered based on a user request, in a state where the determiner determines to not order a new reservoir since the estimated remaining amount of the consumable material is calculated to be more than the actual remaining amount of the consumable material in the tank due to such a supply failure that the consumable material of the predetermined volume has not been adequately supplied from the reservoir into the tank.

7. The system according to claim 5, further comprising an indication value obtainer configured to:

obtain a user-specified indication value regarding a remaining amount of the consumable material in the tank; and when the indication value has been obtained, replace the estimated remaining amount of the consumable material with the obtained indication value.

8. The system according to claim 7, further comprising a number-of-bottle-ordering-times resetter configured to reset the order count when the indication value has been obtained.

9. The system according to claim 1, further comprising:

a processor; and a non-transitory computer-readable medium storing computer-readable instructions, the instructions, when executed by the processor, causing the system to:

obtain the cumulative consumption amount of the consumable material;

obtain the predetermined volume;

obtain the order count;

obtain the consumption error correction value; and determine whether to order a new reservoir, based on the cumulative consumption amount of the consumable material, the predetermined volume, the order count, and the consumption error correction value.

10. A printing apparatus comprising:

a tank configured to store therein a consumable material for printing supplied in units of a predetermined volume from a reservoir, without any detector to detect an actual remaining amount of the consumable material in the tank;

a print engine configured to perform image formation on a printing medium using the consumable material in the tank; and a controller configured to:

obtain a cumulative consumption amount of the consumable material used for the image formation by the print engine;

obtain the predetermined volume corresponding to a capacity of the reservoir;

obtain an order count representing how many times an order for the reservoir has been heretofore placed;

obtain a consumption error correction value for correcting an individual difference in consumption characteristics for the print engine to consume the consumable material; and determine whether to order a new reservoir, based on the cumulative consumption amount of the consumable material, the predetermined volume, the order count, and the consumption error correction value.

11. The printing apparatus according to claim 10, wherein the controller comprises:

a processor; and a non-transitory computer-readable medium storing computer-readable instructions configured to, when executed by the processor, cause the controller to:

obtain the cumulative consumption amount of the consumable material;

obtain the predetermined volume;

obtain the order count;

obtain the consumption error correction value; and determine whether to order a new reservoir, based on the cumulative consumption amount of the consumable material, the predetermined volume, the order count, and the consumption error correction value.

12. A method implementable on a processor of a system comprising a tank and a print engine, the tank being configured to store therein a consumable material for printing supplied in units of a predetermined volume from a reservoir, without any detector to detect an actual remaining amount of the consumable material in the tank, the method comprising:

obtaining a cumulative consumption amount of the consumable material used for the image formation by the print engine, the print engine being configured to perform image formation on a printing medium using the consumable material in the tank;

obtaining the predetermined volume corresponding to a capacity of the reservoir;

obtaining an order count representing how many times an order for the reservoir has been heretofore placed;

obtaining a consumption error correction value for correcting an individual difference in consumption characteristics for the print engine to consume the consumable material; and determining whether to order a new reservoir, based on the cumulative consumption amount of the consumable material, the predetermined volume, the order count, and the consumption error correction value.

* * * * *